(12) United States Patent
Sukumaran et al.

(10) Patent No.: US 9,984,140 B1
(45) Date of Patent: May 29, 2018

(54) LEASE BASED LEADER ELECTION SYSTEM

(71) Applicant: Amazon Technologies, Inc., Seattle, WA (US)

(72) Inventors: Anish Sukumaran, Chantilly, VA (US); Vincent Gerard Nicotra, Lansdowne, VA (US)

(73) Assignee: Amazon Technologies, Inc., Seattle, WA (US)

( * ) Notice: Subject to any disclaimer, the term of this patent is extended or adjusted under 35 U.S.C. 154(b) by 616 days.

(21) Appl. No.: 14/615,302

(22) Filed: Feb. 5, 2015

(51) Int. Cl.
*G06F 17/30* (2006.01)

(52) U.S. Cl.
CPC .. *G06F 17/30575* (2013.01); *G06F 17/30309* (2013.01)

(58) Field of Classification Search
None
See application file for complete search history.

(56) References Cited

U.S. PATENT DOCUMENTS

| | | | |
|---|---|---|---|
| 9,690,675 B2* | 6/2017 | Madduri | G06F 11/2005 |
| 2004/0230619 A1* | 11/2004 | Blanco | G06F 17/30575 |
| 2007/0174661 A1 | 7/2007 | Peddada | |
| 2007/0294577 A1 | 12/2007 | Fiske | |
| 2008/0010490 A1* | 1/2008 | Revanuru | G06F 11/2028 714/4.1 |
| 2009/0144338 A1 | 6/2009 | Feng et al. | |
| 2012/0254116 A1* | 10/2012 | Thereska | G06F 17/30091 707/640 |
| 2013/0007090 A1* | 1/2013 | Sankararaman | H04L 67/34 709/201 |
| 2013/0111261 A1* | 5/2013 | Dalton | G06F 17/30581 714/4.11 |
| 2014/0019519 A1 | 1/2014 | Burman et al. | |
| 2014/0244581 A1 | 8/2014 | Rath | |
| 2016/0019125 A1* | 1/2016 | Madduri | G06F 11/2005 714/4.11 |

\* cited by examiner

*Primary Examiner* — Richard Bowen
(74) *Attorney, Agent, or Firm* — Robert C. Kowert; Meyertons, Hood, Kivlin, Kowert & Goetzel, P.C.

(57) ABSTRACT

A database service may store data on behalf of clients in multiple replicas on respective computing nodes in different availability zones. The service may employ a lease based protocol to select a master replica for a replica group that does not depend on an external service, but is managed by client processes executing on the database hosts themselves. To assume the role of a primary (writable) master for a database table, a master host may acquire a lease by updating a lease record for the table that is maintained in a consistent data store. If the master host fails to renew the lease within a pre-determined lease period, it may revert to read-only mode, and a secondary master host, having determining (based on the lease record) that the primary master no longer holds the lease, may assume the role of primary master by acquiring the lease and making itself writable.

21 Claims, 15 Drawing Sheets

LEASE BASED LEADER ELECTION SYSTEM

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. Interaction between client applications and database servers typically includes read operations (read-only queries), write operations (to store data), and update operations that can be conceptualized using a read-modify-write workflow.

In some existing database systems, the techniques employed for managing mastership of write operations and consistent read operations and/or for performing master failovers rely on an external lock/lease service or manager and/or rely on quorum and persistence facilities that require a particular number of healthy nodes (e.g., more than two) in order to operate correctly. In some existing systems, a consensus mechanism is required for enacting a steady state view change and for determining the new master credentials.

Figure 1:
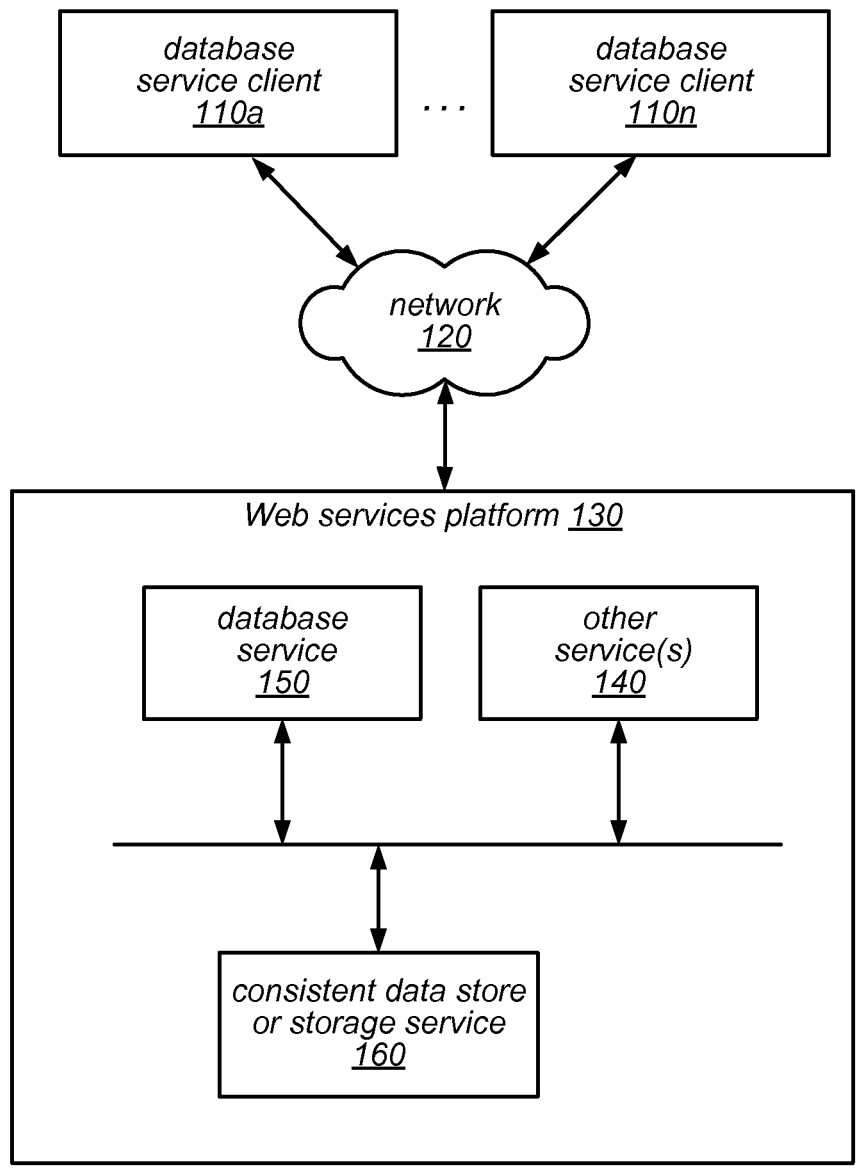
FIG. 1 is a block diagram illustrating one embodiment of a system architecture that is configured to implement a Web services-based database service such as that described herein.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The systems and methods described herein may be employed in various combinations and in various embodiments to implement a Web-based service that provides database services to database service clients (e.g., user, subscribers, or client applications that access the database service on behalf of users or subscribers). These systems may provide a high level of durability and availability through replication and automated failover. As described in more detail herein, the database services may employ lease based leader election and master failover mechanisms.

In some embodiments, the database services described herein may store data on behalf of clients in multiple replicas on respective computing nodes in different availability zones. These services may employ a lease based protocol to select a master replica for a replica group that does not depend on an external service or manager, but that is managed by client processes executing on the database hosts themselves by writing to and reading from tables in a consistent data store (e.g., one that achieves read-after-write consistency) to which they all have access.

In one example, to assume the role of a primary (writable) master for a database table, a master host may acquire a lease by updating a lease record for the table that is maintained in a consistent data store. If the primary master host fails to renew the lease within a pre-determined lease period (which may be the same as the heartbeat period for the primary master host), it may revert to read-only mode, and a secondary master host, having determining (based on the information in the lease record) that the primary master no longer holds the lease, may assume the role of primary master by acquiring the lease and making itself writable. The master failover protocol may be performed automatically (e.g., without human intervention or initiation) in response to the failure of a primary master or its inability to renew its lease, in some embodiments. In other embodiments, the master failover protocol may be performed semi-automatically, e.g., requiring the intervention of a technician to ensure that only one master node is writable at a time.

One embodiment of a system architecture that is configured to implement a Web services-based database service such as that described herein is illustrated in FIG. 1. It is noted that, in this and other ones of the drawings, where one or more instances of a given component may exist, reference to that component herein below may be made in either the singular or the plural. However, usage of either form is not intended to preclude the other. In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a distributed system including a number of computing nodes (or simply, nodes), such as the computer node embodiment illustrated in FIG. 15 and discussed below. In various embodiments, the functionality of a given database service system component, storage component, or storage service component may be implemented by a particular computing node or may be distributed across several computing nodes. In some embodiments, a given computing node may implement the functionality of more than one component.

Generally speaking, database service clients 110a-110n may encompass any type of client configurable to submit web services requests to Web services platform 130 via network 120. For example, a given database service client 110 may include a suitable version of a web browser, or a plug-in module or other type of code module configured to execute as an extension to or within an execution environment provided by a web browser to provide database service clients (e.g., client applications, users, and/or subscribers) access to the database services (such as database service 150), storage services (such as through consistent data store or storage service 160), and/or other services (such as other services 140) provided by Web services platform 130. Alternatively, a database service client 110 may encompass an application such as a database application, media application, office application or any other application that may make use of such services. In some embodiments, such an application may include sufficient protocol support (e.g., for a suitable version of Hypertext Transfer Protocol (HTTP)) for generating and processing web services requests without necessarily implementing full browser support for all types of web-based data. That is, database service client 110 may be an application configured to interact directly with Web services platform 130. In various embodiments, database service client 110 may be configured to generate web services requests according to a Representational State Transfer (REST)-style web services architecture, a document- or message-based web services architecture, or another suitable web services architecture.

In some embodiments, database service client 110 may be configured to provide access to web-based services to other applications in a manner that is transparent to those applications. For example, database service client 110 may be configured to integrate with an operating system or file system to provide database services (such as database service 150), storage services (such as through consistent data store or storage service 160), or other services (such as other services 140) in accordance with a suitable variant of the techniques described herein. However, the details of interfacing to Web services platform 130 may be coordinated by database service client 110 and the operating system or file system on behalf of applications executing within the operating system environment.

Database service clients 110 may convey service requests to and receive responses from Web services platform 130 via network 120. In various embodiments, network 120 may encompass any suitable combination of networking hardware and protocols necessary to establish web-based communications between clients 110 and platform 130. For example, network 120 may generally encompass the various telecommunications networks and service providers that collectively implement the Internet. Network 120 may also include private networks such as local area networks (LANs) or wide area networks (WANs) as well as public or private wireless networks. For example, both a given client 110 and Web services platform 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and Web services platform 130. It is noted that in some embodiments, database service clients 110 may communicate with Web services platform 130 using a private network rather than the public Internet. For example, clients 110 may be provisioned within the same enterprise as the database service (and/or the underlying system) described herein. In such a case, clients 110 may communicate with platform 130 entirely through a private network 120 (e.g., a LAN or WAN that may use Internet-based communication protocols but which is not publicly accessible).

Generally speaking, Web services platform 130 may be configured to implement one or more service endpoints configured to receive and process web services requests, such as requests to access tables maintained on behalf of clients/users by database service 150, and/or the items and attributes stored in those tables. For example, Web services platform 130 may include hardware and/or software configured to implement various service endpoints and to properly receive and process HTTP-based web services requests directed to those endpoints. In one embodiment, Web services platform 130 may be implemented as a server system configured to receive web services requests from clients 110 and to forward them to various components that collectively implement a consistent data store or consistent data storage service 160 for processing. In still other embodiments, Web services platform 130 may be configured as a number of distinct systems (e.g., in a cluster topology) implementing load balancing and other request management features configured to dynamically manage large-scale web services request processing loads.

In some embodiments, Web services platform 130 may include a front end module (which may be configured to receive, authenticate, parse, throttle and/or dispatch service requests, among other things), one or more administrative components, and/or other components not shown (various ones of which may be configured to provide a variety of visibility and/or control functions). In some embodiments, database service 150 may include a plurality of database node instances, each of which may maintain and manage one or more database tables on behalf of clients/users. Some of the functionality provided by each of these types of components is described in more detail herein, according to various embodiments.

In various embodiments, Web services platform 130 may be configured to support different types of web services requests. For example, in some embodiments, platform 130 may be configured to implement a particular web services application programming interface (API) that supports a variety of operations on tables that are maintained and managed on behalf of clients/users by the database service 150 (and/or data stored in those tables). Examples of at least some of the operations supported by such an API are described herein.

In addition to functioning as an addressable endpoint for clients' web services requests, in some embodiments Web services platform 130 may implement various client management features (not shown). For example, platform 130 may coordinate the metering and accounting of client usage of web services, including storage resources, such as by tracking the identities of requesting clients 110, the number and/or frequency of client requests, the size of tables and/or items stored or retrieved on behalf of clients 110, overall storage bandwidth used by clients 110, class of storage requested by clients 110, and/or any other measurable client usage parameter. Platform 130 may also implement financial accounting and billing systems, or may maintain a database of usage data that may be queried and processed by external systems for reporting and billing of client usage activity. In some embodiments, platform 130 may include a lock manager and/or a bootstrap configuration (not shown).

In various embodiments, a data storage service may be implemented on one or more computing nodes that are configured to perform the functionality described herein. In some embodiments, the service may be implemented by a Web services platform (such as Web services platform 130 in FIG. 1) that is made up of multiple computing nodes, each of which may perform one or more of the functions described herein. Various collections of the computing nodes may be configured to provide the functionality of a cluster of resources dedicated to the database service 150, another cluster of resources dedicated to the consistent data storage service 160, and/or a collection of resources that may be shared between multiple Web services or applications, in some embodiments. In some embodiments, an external workflow component (not shown) may be used to perform distributed operations, such as those that extend beyond a particular partition replication group. As noted above, in various embodiments, the database systems described herein may store data in replicated partitions on multiple storage nodes (which may be located in multiple data centers) and may implement a lease base master failover protocol.

In some embodiments, the database systems described herein may be deployed across multiple "availability zones", each of which may include its own physically distinct, independent infrastructure on which a collection of computing nodes (e.g., computing nodes on which storage system server nodes and/or database engine head nodes are implemented). In some embodiments, each availability zone may reside in a different location or region, while in other embodiments multiple availability zones may reside in the same location or region. In some embodiments, the database systems may provision primary resource instance capacity for a given database in one availability zone (e.g., enough resource instance capacity to implement a database engine head node and one or more storage system server nodes, along with corresponding storage devices), and may provision additional resource instance capacity for the given database in another availability zone (e.g., enough resource instance capacity to implement one or more redundant storage system server nodes, along with corresponding storage devices storing replicas of the data stored in the primary availability zone).

In some embodiments, the database services described herein may store multiple replicas split across multiple availability zones. Each availability zone in the topology may contain a full slaving tree that includes a master host and multiple read-only slaves that receive data through synchronous or asynchronous replication, in different embodiments. The master hosts may also replicate data to each other using synchronous or asynchronous replication, in different embodiments. One of the master hosts may be designated as the primary master host by setting a parameter of its database instance to allow writes to the database, and the secondary master host in the other zone may only become writable after a failover. In some embodiments, an extra candidate master may also exist in each availability zone. This extra candidate master may act as a read-only slave until and unless a primary or secondary master needs to be replaced. In some embodiments, processes that make mutating database changes may poll all the master hosts to identify the particular database that is currently writable. Note that only a single master can be in a writable state at any given point in time in order to prevent data inconsistencies and collisions.

Figure 2:
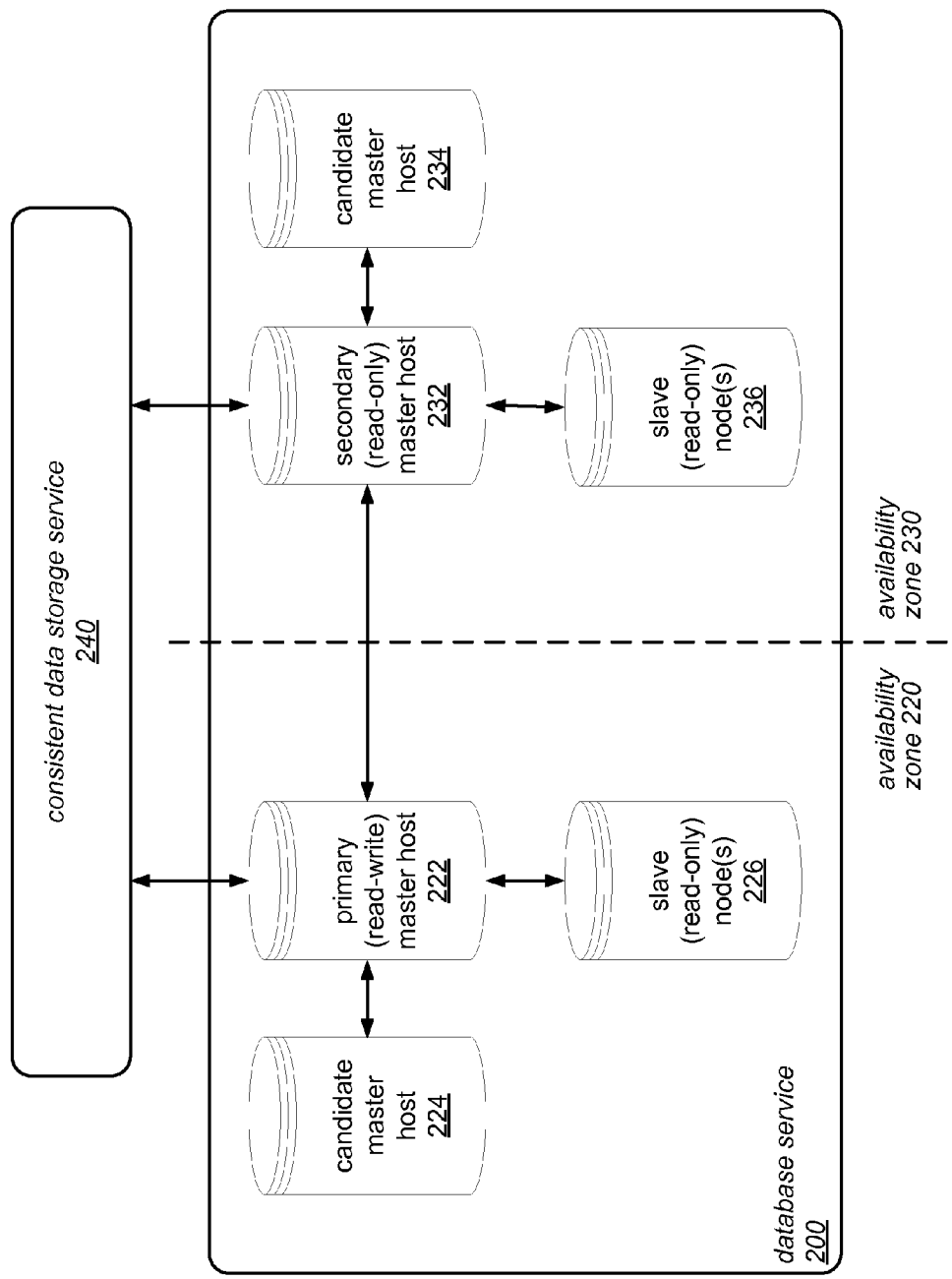
FIG. 2 is a block diagram illustrating one embodiment of a database replication topology that implements lease based leader election.

FIG. 2 is a block diagram illustrating one embodiment of a database replication topology that implements lease based leader election, specifically, one that employs a consistent data storage service to maintain lease and replication status information, and that uses synchronous replication between the master nodes and asynchronous replication between master nodes and slave nodes. Note that, in some embodiments, the lease base failover protocol may be enabled only on the primary and secondary master hosts. More specifically FIG. 2 illustrates various components of a database service 200 that operates in two availability zones (e.g., availability zone 220 and availability zone 230). In this example, the database service includes a master host, a candidate master host, and one or more slave nodes in each availability zone, each of which maintains a database replica. In this example, master host 222 in availability zone 220 serves as the primary (read-write) master host for the database, while master host 232 in availability zone 230 serves as the secondary (read-only) master host for the database. In this example, the database service also includes candidate master host 224 and one or more slave nodes 226 in availability zone 220, as well as candidate master hose 234 and one or more slave nodes 236 in availability zone 230.

In this example, database service 200 implements the lease based leader election techniques described herein, which includes storing information reflecting the lease state, the replication status, and audit data for one or more hosts in a consistent data storage service 240. In this example, consistent data storage service 240 is accessible for reading and writing by the master hosts implemented in database service 200, e.g., primary (read-write) master host 222 in availability zone 220 or secondary (read-only) master host 232 in availability zone 230. For example, client processes executing on the primary and secondary master hosts may communicate with consistent data storage service 240 to perform lease management and/or replication status management, as described herein. Note that the components that implement consistent data storage service 240 may or may not be distributed across physical resources and/or locations in the same manner as the components that implement database service 200 (e.g., across multiple availability zones that include availability zone 220 and availability zone 230), in different embodiments. In other words, the architecture of consistent data storage service 240 may be separate from and independent of the architecture of database service 200 with regard to the distribution and location of its components.

In various embodiments, the data storage service described herein may provide an application programming interface (API) that includes support for some or all of the following operations on the data in a table maintained by the service on behalf of a storage service client: PutItem, which puts (or stores) an item in the table; GetItem, which gets (or retrieves) one or more items from the table having a specified primary key; DeleteItem, which deletes an item from the table; UpdateItem, which updates the attributes in a single item; Query, which searches for items using an index; and Scan, which scans (e.g., lists items) over the whole table, optionally filtering the items returned. Note that the amount of work (e.g., the number of database table accesses) required to satisfy service requests that specify these operations may vary depending on the particular operation specified and/or the amount of data that is accessed and/or transferred between the storage system and the client in order to satisfy the request.

Figure 3:
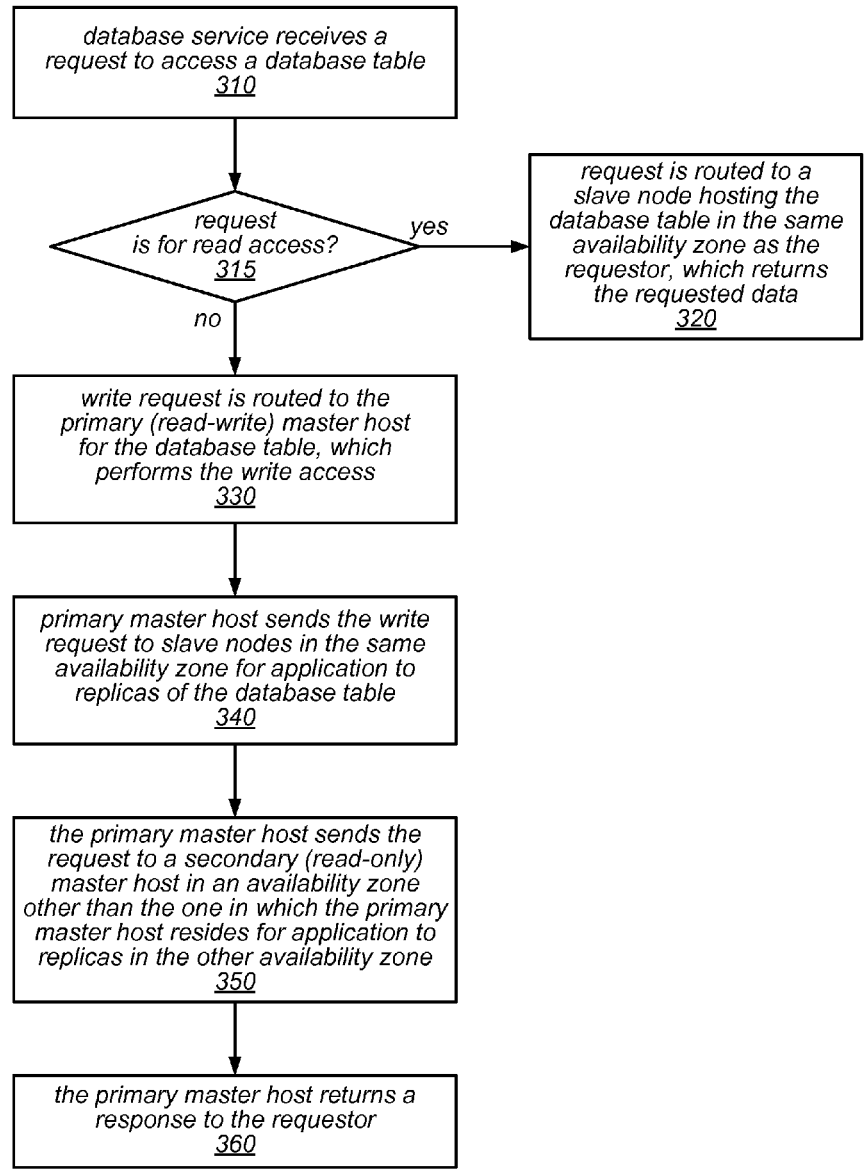
FIG. 3 is a flow diagram illustrating one embodiment of a method for servicing read and write requests that target a database table.

One embodiment of a method for servicing read and write requests that target a database table is illustrated by the flow diagram in FIG. 3. As illustrated at 310, in this example, the method may include a database service receiving a request to access a database table. If the request is for a read access, shown as the positive exit from 315, the method may include routing the request to a slave node that hosts the target database table in the same availability zone as the requestor, which then returns the requested data, as in 320.

If the request is not for a read access (i.e., if the request is for a write access), shown as the negative exit from 315, the method may include routing the write request to the primary (read-write) master host for the database table, which then performs the write access, as in 330. As illustrated in this example, the method may also include the primary master host sending the write request (e.g., as a log record specifying the write transaction indicated in the request) to the slave nodes in the same availability zone (i.e., in the same availability zone as the primary master host) for its application to replicas of the target database table (e.g., slave nodes in the same availability zone that host read-only replicas of the target database table), as in 340. As illustrated in this example, the method may also include the primary master host sending the write request (e.g., as a log record specifying the write transaction indicated in the request) to a secondary (read-only) master host in an availability zone other than the one in which the primary master host resides for application to replicas in the other availability zone, as in 350, and the primary master host returning a response to the requestor (e.g., an indication of whether the requested write operation was successfully performed), as in 360. Note that while FIG. 3 illustrates an embodiment in which the primary master host may replicate (or at least initiate the replication of) write requests to slave nodes in the same availability zone and/or to a secondary master host in another availability zone prior to returning a response to the requestor, in other embodiments, the operations illustrated in elements 340, 350, and 360 may be performed substantially in parallel or in an order other than that depicted in FIG. 3.

In some embodiments, a planned failover may be accomplished by using a script that connects to the current primary and secondary masters and switches the writable state on each host so that the secondary master becomes the new primary master. This script may execute quickly (e.g., in 2 or 3 seconds), giving any inflight API calls sufficient time to retry against the new primary.

In some exiting systems, in response to an unplanned outage of the primary master host, a long manual process may be needed to promote the secondary master in the other availability zone to be the primary (writable) master. For example, a technician may need to ensure that the old primary will not come back online in a writeable state before the secondary master can be promoted. In some cases, it may take an hour or more just to get a technician onsite to physically unplug the primary master, during which any mutating API calls that are received will fail.

As described in more detail below, a database system may instead implement a lease based failover system that allows both planned and unplanned failovers to be executed on the order of minutes so that customer impact can be significantly decreased. In some embodiment, the system may use a database architecture with asynchronous replication, which may allow an engineer to execute an unplanned failover within minutes using a single command. In other embodiments, the master database hosts may use synchronous replication and the system may perform a fully automated failover in response to host failures, availability zone outages, or the loss of communication between master database hosts and the consistent data store in which lease information and replication status information are maintained for use within the lease based failover protocol.

Figure 4:
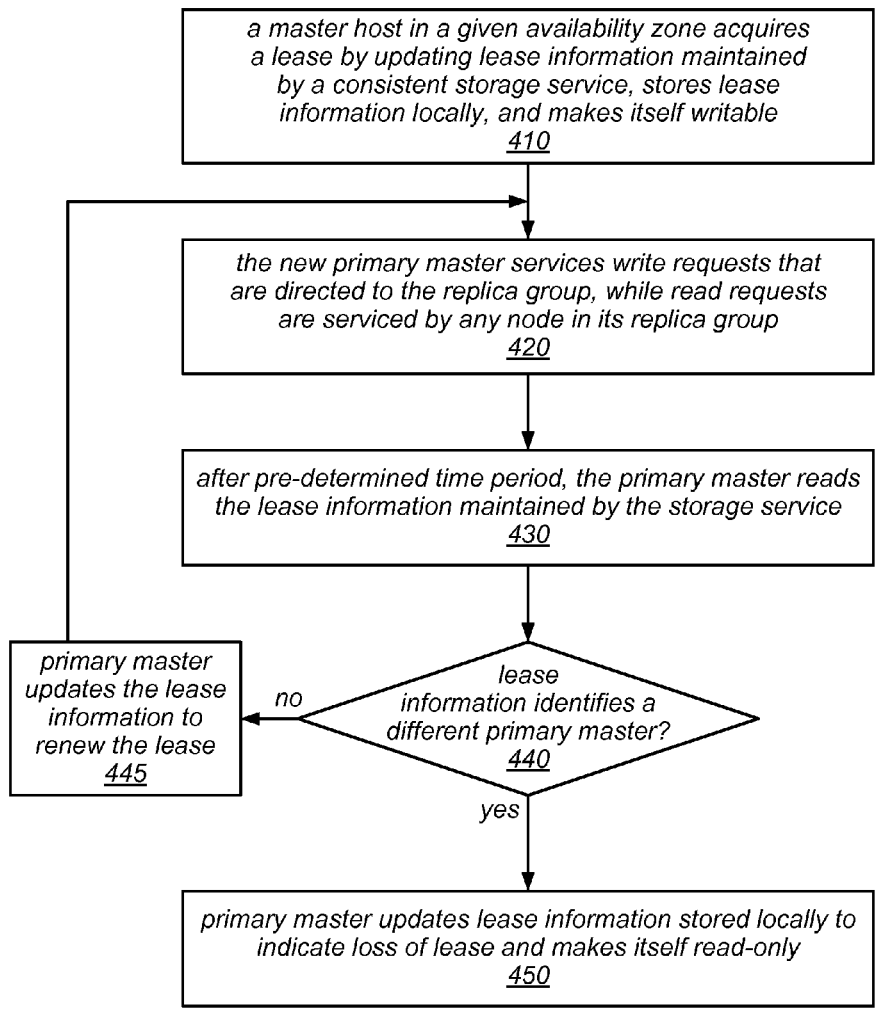
FIG. 4 is a flow diagram illustrating one embodiment of a method for a master host to assume the role of primary master for a replica group.

One embodiment of a method for a master host to assume the role of primary master for a replica group (e.g., a replica group that includes a secondary master node in another availability zone and one or more slave nodes in each of the availability zones) is illustrated by the flow diagram in FIG. 4. As illustrated at 410, in this example, the method may include a master host in a given availability zone acquiring a lease by updating lease information maintained by a consistent storage service, storing the lease information locally, and making itself writable. For example, in some embodiments, the master candidate may write to a lease record that was stored to the consistent storage service (e.g., at the time the database table was created) and that is accessible by any primary or secondary master for the database table in any availability zone or region.

As illustrated in this example, the method may include the new primary master servicing write requests that are directed to the replica group, while read requests are serviced by any node in its replica group (e.g., any master or slave node in the same availability zone or region as the requestor or in another availability zone or region), as in 420. The method may also include, after pre-determined time period, the primary master reading the lease information (e.g., the lease record for the database table) that is maintained by the storage service, as in 430. If the lease information does not identify a different primary master, shown as the negative exit from 440, the method may include the primary master updating the lease information to renew the lease, as in 445. For example, the primary master may update a lease record for the database that is maintained by the consistent storage service and may also update the lease information stored locally to indicate that the lease has been renewed.

On the other hand, if the lease information identifies a different primary master, shown as the positive exit from 440, the method may include the primary master (which, at this point is no longer the primary master) updating the lease information that is stored locally to indicate its loss of the lease and making itself a read-only node, as in 450. For example, the former primary master may update a lease record for the database that is stored locally to indicate that another master has assumed the role of primary master for the database table. Note that these and/or other update operations may, in various embodiments, be performed using one or more instructions that implement a read-modify-write type workflow, such as, but not limited to, an atomic compare-and-swap (CAS) type instruction. For example, any or all of the update operations described herein may read the value of a given memory location, compare that value to an expected value for the given memory location, and only if the value that was read matches the expected value, write a new value to the given memory location.

As noted above, the lease based leader election and failover protocols described herein may be managed by instances of a client process for the protocol that are executing on the primary and secondary masters and that control the writable state of the database. For example, when a database master host is deployed, it may be initialized to operate in read-only mode and the client process may begin monitoring the database. The client process may use a lease mechanism for leader election to determine if the database should become writable and may coordinate the lease state with other clients through data stored in a consistent data store (e.g., one that achieves read-after-write consistency).

In some embodiments, the client process for the protocol has two roles. The first is that of a database state manager, which may be implemented by a single thread of the client process that is responsible for updating and retrieving lease data from the consistent data store and storing current lease information with a timestamp in local memory (e.g., a timestamp indicating the time at which the corresponding lease record was accessed in order to retrieve the lease information from the consistent data store or the time at which the lease information was stored locally). The database state manager may also update a separate table in the consistent data store with the local database log position, which may be subsequently used during the failover process, as described below.

The second role of the client is that of a database write manager, which may be implemented using two threads to control the writable state of the database and to continuously check the local memory on the database master on which it executes for lease information. For example, if a given database host owns a lease and it has been successfully renewed within the current lease period (or the most recent previous lease period), the database write manager may be configured to keep the database on the host in a writable state. Otherwise, the database write manager may be configured to return the database on the host to read-only mode. Note that, in some embodiments, the database command used to switch a database from a writable mode to read-only mode may block until all ongoing database transactions on that host release their locks. In order to ensure that the read-only setting is applied within a bounded time period, a second database write manager thread may be configured to kill all active transactions on the database so that the switch to read-only mode becomes unblocked. For example, in some embodiments, any transactions that start after the read-only mode command is issued will not be able to make mutating changes, and if for any reason, the read-only mode command is not successfully executed within a pre-determined blocking period (e.g., three seconds), the database write manager may be configured to force the server to stop servicing in-flight transactions (e.g., by sending a kill type signal to the database process).

Figure 5:
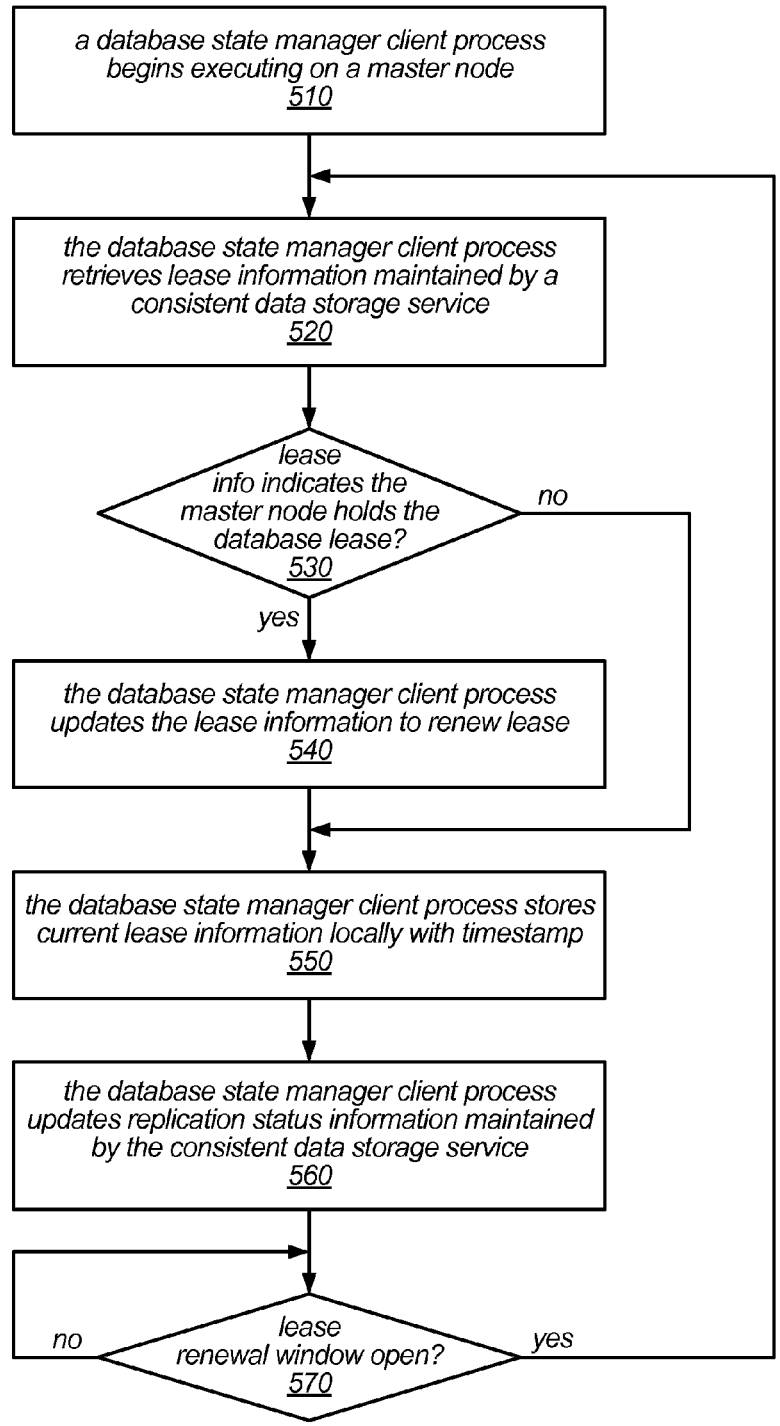
FIG. 5 is a flow diagram illustrating one embodiment of a method for managing database state in a database system that employs lease based leader election.

One embodiment of a method for managing database state in a database system that employs lease based leader election is illustrated by the flow diagram in FIG. 5. As illustrated at 510, in this example, the method may include a database state manager client process beginning execution on a master node (e.g., a master node in one of two availability zones over which the database is replicated). The method may include the database state manager client process retrieving lease information for the database that is maintained by a consistent data storage service, as in 520.

If the lease information indicates that the master node holds the database lease, shown as the positive exit from 530, the method may include the database state manager client process updating the lease information in order to renew the lease, as in 540. The method may also include the database state manager client process storing the current lease information locally (e.g., information indicating that the database lease has been renewed), along with a local timestamp (as in 550), and the database state manager client process updating replication status information for the database that is maintained by the consistent data storage service (as in 560). As illustrated in this example, if the lease information does not indicates that the master node holds the database lease, shown as the negative exit from 530, the method may not include the database state manager client process updating the lease information in order to renew the lease (as in 540), but the method may include the database state manager client process storing the current lease information locally (e.g., information indicating which other master host holds the database lease), along with a local timestamp (as in 550), and the database state manager client process updating replication status information for the database that is maintained by the consistent data storage service (as in 560).

In either case, until and unless the lease renewal window is open for the database, there may be no additional changes made to the stored lease information or replication status information. This is illustrated in FIG. 5 by the feedback from the negative exit of 570 to its input. However, once (and each time) the lease renewal window is open (e.g., once a heartbeat period or other pre-determined period of time has passed since the last time the lease was renewed), shown as the positive exit from 570, the method may include the database state manager client process repeating the operations illustrated at 520-560. Note that, in some embodiments, each master host (e.g., one master host in each availability zone over which the database is replicated) may execute the database state manager client process described herein, including the master host that is (or will become) the primary master and the other master host (which is, or will become, the secondary master).

Figure 6:
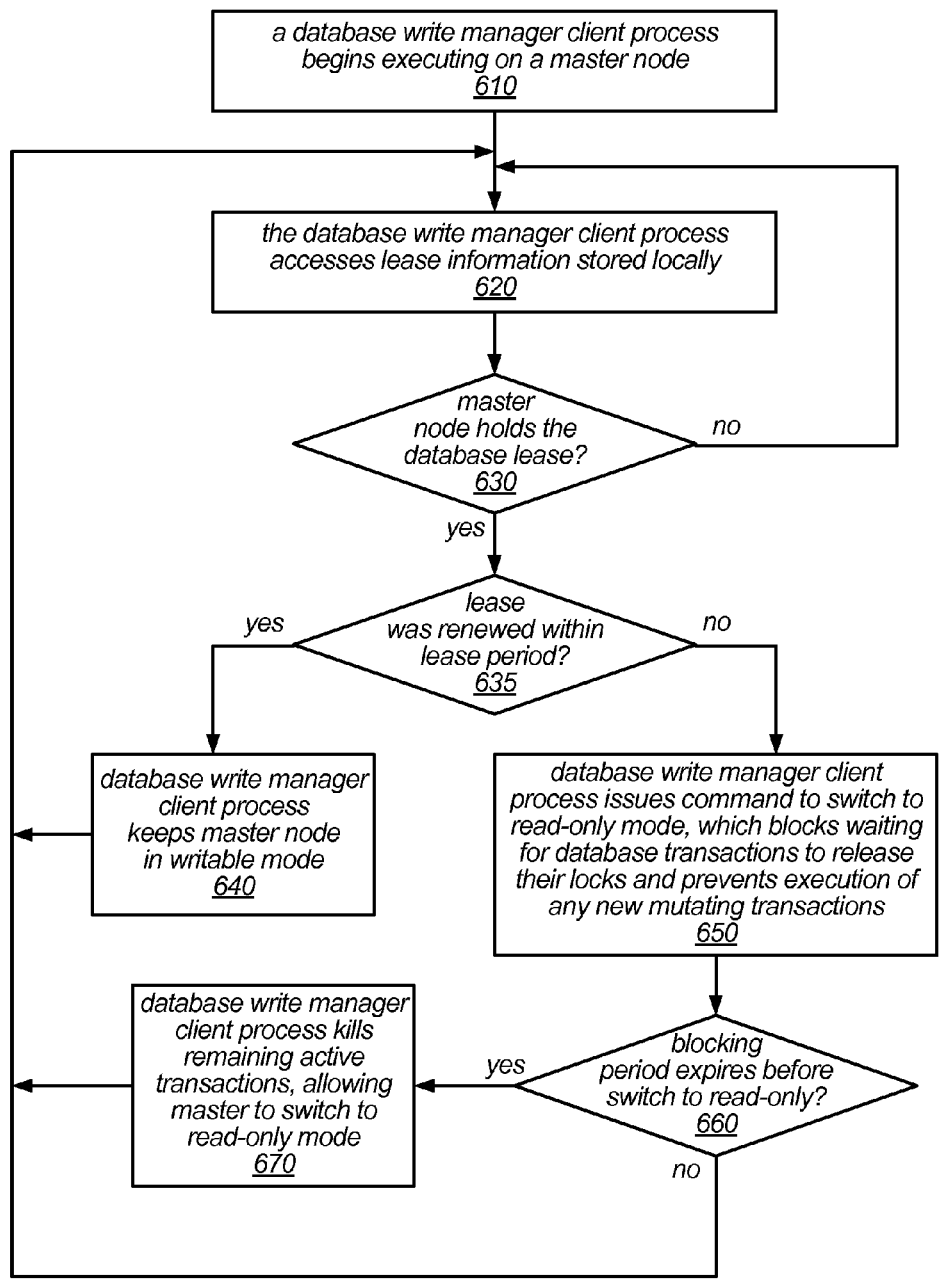
FIG. 6 is a flow diagram illustrating one embodiment of a method for managing read-write state in a database system that employs lease based leader election.
Figure 7:
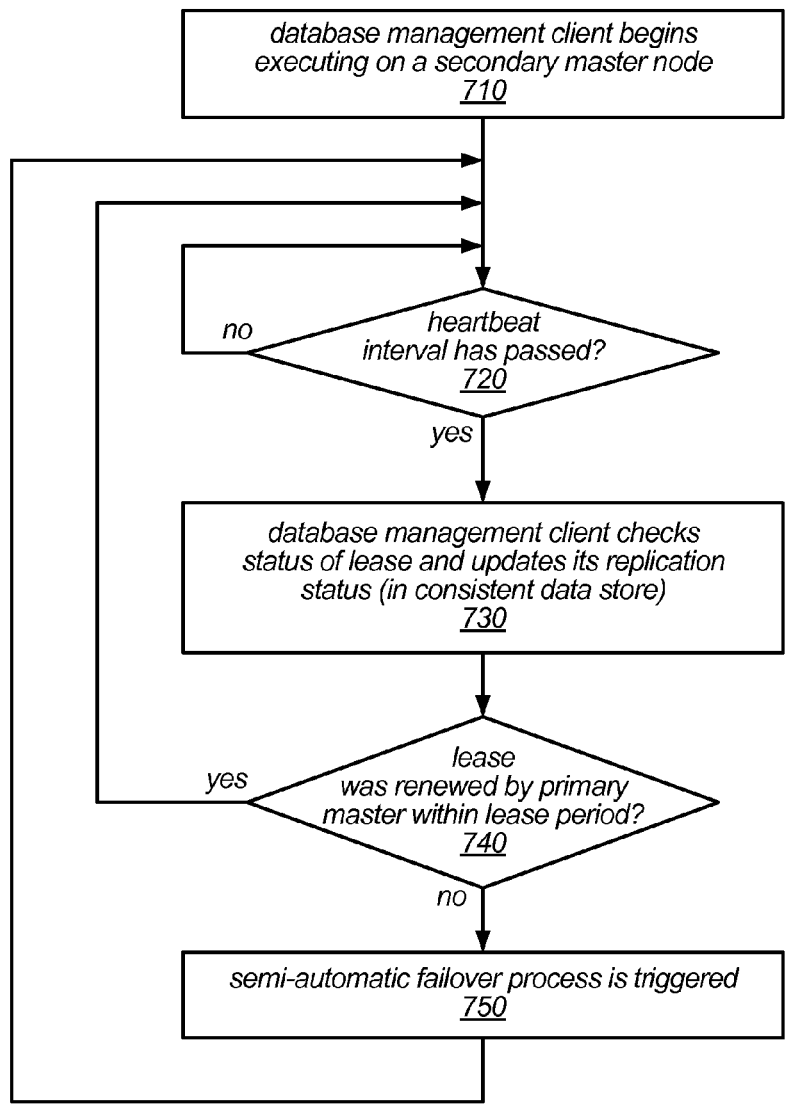
FIG. 7 is a flow diagram illustrating one embodiment of a method for performing a semi-automatic failover in a database service.

One embodiment of a method for managing read-write state in a database system that employs lease based leader election is illustrated by the flow diagram in FIG. 6. As illustrated at 610, in this example, the method may include a database write manager client process beginning execution on a master node (e.g., a master node in one of two availability zones over which the database is replicated). The method may include the database write manager client process accessing lease information that is stored locally (e.g., lease information that was stored by a corresponding database state manager client process), as in 620. As illustrated in this example, if the master node does not hold the database lease, the database write manager client process may not take any action at that time, but may continue to poll the lease information that is stored locally. This is illustrated in FIG. 6 by the feedback from the negative exit of 630 to 620. Note that, as illustrated in FIG. 7 and described below, in some embodiments, a master node that does not hold the lease may attempt to obtain the lease (e.g., if the current primary master has not renewed the lease within a pre-determined wait time).

As illustrated in FIG. 6, if the master node holds the database lease (shown as the positive exit from 630), and if the lease was renewed within lease period (shown as the positive exit from 635), the method may include the database write manager client process keeping the master node in a writable mode (e.g., in read-write mode), as in 640, after which it may continue to poll the lease information that is stored locally (as in 620). On the other hand, if the master node holds the database lease (shown as the positive exit from 630), but the lease was not renewed within lease period (shown as the negative exit from 635), the method may include the database write manager client process issuing a command to switch the master node to read-only mode, as in 650. Note that, as illustrated in this example, this command may, in some embodiments, block waiting for database transactions to release their locks and may prevent execution of any new mutating transactions. In this example, if a pre-determined blocking period expires before the master node is able to switch to read-only mode (shown as the positive exit from 660), the method may include the database write manager client process killing the remaining active transactions, thus allowing the master node to switch to read-only mode, as in 670. In this case, or in the case that the master node is able to switch to read-only mode prior to the end of the blocking period (shown as the negative exit from 660), the method may include the database write manager client process continuing to poll the lease information that is stored locally (shown as the feedback from 670 and 660 to 620). Note that in other embodiments, rather than killing the remaining active transactions if the blocking period expires before the master node is able to switch to read-only mode, the method may include killing the database process itself on the master node (e.g., if the database process appears to be hung). Note also that, in still other embodiments, the command to switch the master node to read-only mode, as in 650, may not be a blocking command. For example, in some embodiments, an operation initiated by the database write manager to switch the master node to read-only may include an operation to kill any pending transactions or the database process itself (on the master node). In another example, in some embodiments it may not be necessary to wait for any pending transactions to complete before making the switch to read-only mode. In various ones of these other embodiments, the operations illustrated in elements 660 and/or 670 may be elided.

In some embodiments, in support of the techniques described herein for managing lease state (e.g., for a lease that represents an authorization of a master host to act as the primary master host for a database table for a pre-determined lease period), a lease (or, more precisely a "lease record") may be maintained by the consistent data storage system as a single row in a table having the following structure:

TABLE 1

Example lease record

| Primary Hash key | Attributes |
|---|---|
| lease_name (string) | host (string), wait_time (number), record_version (number), force_writable (binary), previous_master_wait_time (number) |

As illustrated in this example, the lease record may include any or all of the following elements:
- lease_name: The name of the application level lease that is being acquired
- host: The name of the host that currently holds the lease
- wait_time: The time in milliseconds for which the host holds the lease (e.g., the length of time that the lease is expected to be held)
- record_version: A monotonically increasing integer that may be used to indicate each renewal and/or takeover of the lease
- force_writable: A flag that, if set, may force a new primary master host to become writable in the event that data loss occurs and the new primary master is unable to obtain the replicated data. If this flag is not set, the system will not allow a database to enter a writable mode (e.g., a read-write mode) if it detects that its log position has not caught up to the log position of the previous primary master.
- previous_master_wait_time: An indication of the previous wait time that a new primary master may examine to determine the appropriate amount of time that the new master should wait for the previous primary master to go into read-only mode. Note that when a lease is assigned to a new owner, it is possible that the wait time associated with the lease after the re-assignment has a different value than the wait time associated with the previous primary master.

In some embodiments, client processes may check the state of a lease using a GetItem request that specifies the lease name. If the lease does not exist, a new one may be created through the use of a conditional PutItem request with a condition that the lease name does not exist. In some embodiments, renewing an existing lease may be performed using a similar process. For example, renewing a lease may be performed through the use of a conditional PutItem request with the condition that the specified record version for the specified lease matches the last value seen by the client.

In some embodiments, in support of the techniques described herein for managing the replication status of various database hosts, the log position of each of the database hosts may be maintained by the consistent data storage system as a single row in a separate table having the following structure:

TABLE 2

Example replication status record

| Primary Hash key | Attributes |
|---|---|
| host (string) | log_position (string), read_only (binary) |

As illustrated in this example, each replication status record may include any or all of the following elements:
- host: The hostname of the database that is updating the row log_position: An indication of the last transaction that was committed on the host. Note that the format of this element may vary based on whether asynchronous or synchronous replication is used. In embodiments in which the system implements asynchronous replication between databases, the log_position value may be stored in a format such as "mysql.0012:2345", where "mysql.0012" identifies the current binary log file and "2345" represents the current log position within that file. In embodiments in which the system implements synchronous replication, the log_position element of the replication status record may contain a numeric value such as "2345" that represents an identifier of the last committed transaction on that server.

read_only: An indication of whether the host is in read-only mode. The value of this element is set to true if the host is in read-only mode.

In some embodiments, the replication status table may be used during a failover to determine whether the secondary master has caught up to the log position of the primary master and/or to detect whether any data loss has occurred. For example, in some embodiments, each database may perform a periodic PutItem operation (with the hostname for the database as the hash key) that updates the log_position and read_only values of the corresponding replication status record (i.e., the replication status record for the specified host). During a failover, the database state manager on the secondary master may obtain the status of the primary master using a GetItem operation. The database state manager executing on the secondary master may be configured to wait until the primary to master switches from a writable mode to read-only mode and until all data on the primary master up to its last recorded log position has been replicated before notifying the database write manager that it is safe to switch the database on the secondary master from read-only mode to a writable mode.

In some embodiments, in support of the techniques described herein for managing primary master hosts in the system, information reflecting each attempt to perform a failover from one primary master host to another may be recorded in an audit table that is maintained by the consistent data storage system as a single row having the following structure:

TABLE 3

Example audit data record

| Primary Hash key | Range Key | Attributes |
|---|---|---|
| new_master (string) | record_version (number) | previous_master (string), timestamp (string), force_writable (binary), client_id (string) |

As illustrated in this example, each audit data record may include any of all of the following elements:

new_master: The hostname that is acquiring the lease record_version: The record_version used to update the lease to the new_master previous_master: The hostname of the previous lease owner timestamp: A timestamp (in milliseconds) that is received from the client that is assigning the lease to the new_master, e.g., a timestamp that conforms to an industry standard format force_writable: As indication of whether the force flag was set when assigning the lease client_id: A unique identifier that indicates which client modified the lease. The value of this element of the audit data record may be used to distinguish between a manual failover that was initiated by a technician and an automated failover.

As noted above, in some embodiments, the system may implement a single master log shipping based replication approach. In some such embodiments, updates may be represented (and distributed to various nodes in the system) as log records. These log records may be replicated in the system, and then (once they are geographically durable) they may be committed and later applied to the schema. This may be thought of as a replication stream in which all replicated updates are serialized through the stages in strictly increasing order (according to associated log sequence numbers). In some embodiments, the state machine may track the latest log sequence number (or the log record that includes the latest log sequence number) to reach each of the states rather than tracking each log sequence number (or its associated log record) individually. The state machine may also allow for batching, and may not be concerned with missed state notifications, since (for example) if a log record with log sequence number L reaches state S, this always implies that all log records with log sequence numbers less than L have also reached state S.

Various replication and failover techniques may employ log records whose elements may be described using some or all of the following terms:

LSN: "Log Sequence Number". In various embodiments, an LSN may include a sequence number, an indication of a master epoch, and a lock generation identifier. These values for a given LSN may in some cases be denoted by sequence(LSN), epoch(LSN), and lock (LSN), respectively.

LSN Sequence: As used herein, this term may refer to the dense, strictly increasing integer sequence of LSNs that define the log stream. This sequence may be defined solely by the sequence(LSN) of each log record.

Log Stream: As used herein, this term may refer to the stream of events defined by the LSN Sequence. In some embodiments, there may be only one valid log stream such that if sequence($LSN_1$)=sequence($LSN_2$), then epoch($LSN_1$)=epoch($LSN_2$) and lock($LSN_1$)=lock ($LSN_2$).

Master Replica: As used herein, this term may refer to the replica that defines (i.e. creates) new LSNs (e.g., the writable replica on the primary master host). In to some embodiments, there may always be zero or one master replica at any given time, and this may be guaranteed by the requirement that a master replica must hold a lease for the corresponding database.

Master Reign: A master replica may act as (i.e. perform the role of) the master for its replica group until it loses (or fails to renew) the lease. A single master reign may be defined from the time when the master replica becomes master (i.e. the time when a replica assumes the role of master replica for its replica group) until the time that it loses (or fails to renew) the lease that authorizes its mastership. During the master reign, the LSN epoch.

LSN Epoch: In some embodiments, this term may refer to the dense, strictly increasing integer sequence of master reigns (where a reign is the time during which a replica serves as the master replica). In some embodiments, when a replica becomes master, the epoch is increased by one, and the first LSN produced by the new master replica may be marked as an epoch change LSN. In the LSN sequence, the epoch may be monotonically increasing.

Epoch Change LSN: In some embodiments, the first LSN of a brand new master epoch may be marked as an "epoch change LSN". This convention may be utilized during log conflict detection to distinguish seemingly valid epoch changes from invalid branches.

Committed LSN: This term may refer to an LSN that is guaranteed to survive.

As used herein, the following sequence terminology may be assumed:

Strictly Increasing: this term refers to a sequence that is always increasing, i.e. a sequence in which every new instance of the sequence has a higher value than the previous instance.

Monotonically Increasing: this term refers to a sequence that is never decreasing, i.e. a sequence in which every new instance of the sequence has an equal or higher value than the previous instance.

Dense: this term refers to a sequence that does not contain holes, i.e. there are no missing members of the sequence. For example, 1, 2, 3, 4, 5, . . . .

Sparse: this term refers to a sequence that may contain holes, possibly a large number of holes (some of which may be large). For example, 1, 2, 7, 9, 1000, . . . .

Note that in some embodiments, timing may only be measured by the local clock(s) on each database host. In such embodiments, the techniques described herein may not depend on clock skew across servers. Instead, they may only depend on the local clocks of individual servers running at the same rate, which may be a base requirement necessary for the lease based failover protocol described herein to function properly, in some embodiments.

In some embodiments (e.g., embodiments that may be referred to as implementing a "manual" or "semi-automatic" failover process), the client processes that implement the protocol may not attempt to acquire a lease if the primary master fails to renew its lease. Instead, they may depend on manual intervention assign the lease to another master. For example, in some such embodiments, after being alerted to the fact that the primary master has failed or has, for some other reason, failed to renew its lease, a technician may manually assign the lease to another master through the use of a command line interface tool or another user input mechanism.

In various embodiments, client processes may make use of any of all of the following three different timing parameters in the application's configuration, example values for which are shown below. Note that the values of these timing parameters may be default values for the system, customer-user- or client-specific, fixed, or user-configurable, in different embodiments.

TABLE 4

Example timing parameter values

| Timing parameter | Parameter value |
| --- | --- |
| Heartbeat time | 1000 milliseconds |
| Wait time | 60000 milliseconds |
| Safe time | 5000 milliseconds |

In some embodiments, at every heartbeat time interval, a client process may check the state of a given lease and update their own replication status in the consistent data store. If the client does not see a heartbeat from the primary master within the specified wait time, they may consider the primary master as failed and may attempt to acquire the lease. In some embodiments, the safe time may represent the amount of time that a primary master has to switch to read-only mode and update its replication status before the wait time expires. In other words, it may represent a specified portion of the wait time interval at the end of that wait time interval. Using the example timing parameter values shown above in Table 4, the primary master is allowed 55 seconds to renew the lease during the wait time period before the start of the safe time. In some embodiments, if a host owns the lease, and it has successfully renewed the lease before the safe time begins, then the database may be set to be writable. If the host does not have the lease or is unable to retrieve the lease information from the consistent data store before the safe time begins, the database may be put into a read-only state.

One embodiment of a method for performing a semi-automatic failover in a database service is illustrated by the flow diagram in FIG. 7. As illustrated at 710, in this example, the method may include a database management client beginning execution on a secondary master node (e.g., a master node that resides in a different availability zone than the primary master node for the corresponding database). Once a pre-determined heartbeat interval has passed (shown as the positive exit from 720), the method may include the database management client checking the status of a lease associated with the database and updating its replication status (both of which may be maintained in consistent data store), as in 730.

As illustrated in this example, if the lease was renewed by the primary master within a pre-determined lease period, shown as the positive exit from 740, the database management client may not take any action at this time, but may continue to check the lease status and update its replication state at each heartbeat interval. This is illustrated in FIG. 7 by the feedback from the positive exit of 740 to 720. On the other hand, if the lease was not renewed by the primary master within a pre-determined lease period, shown as the negative exit from 740, the method may include triggering a semi-automatic failover process, as in 750. In some embodiments, after a semi-automatic failover process is triggered, the database management client may not take any action at this time, but may continue to check the lease status and update its replication state at each heartbeat interval. This is illustrated in FIG. 7 by the feedback from 750 to 720.

In some embodiments, in order to trigger the failover process, a technician may follow a set of procedures to determine whether the secondary master is healthy and, if so, may run a command line interface tool or script to assign the lease to the secondary master. The tool may first validate that the specified target host is the secondary master, after which it may update the audit table maintained in the consistent data store with the lease takeover details, and assign the lease to the new host. In some embodiments, the database state manager executing on the new primary master may see that it has acquired the lease and may wait for the wait time to elapse so that the old primary can safely switch back to read-only mode. If wait time expires, or once the database state manager sees that the old master has switched to read-only mode in the replication status table, the database state manager may wait until the local log position is greater than or equal to the last value stored in the consistent data store for the previous master before allowing the database write manager to switch the new primary master to a writable mode. In some embodiment, if the force_writable flag is set, the database state manager of the new primary master may allow the database write manager to switch to writable mode once the wait time has expired. For example, this may be needed in the case in which the old primary master experienced a failure and was unable to replicate all of its data to its secondary master (which is now the new primary master).

Figure 8:
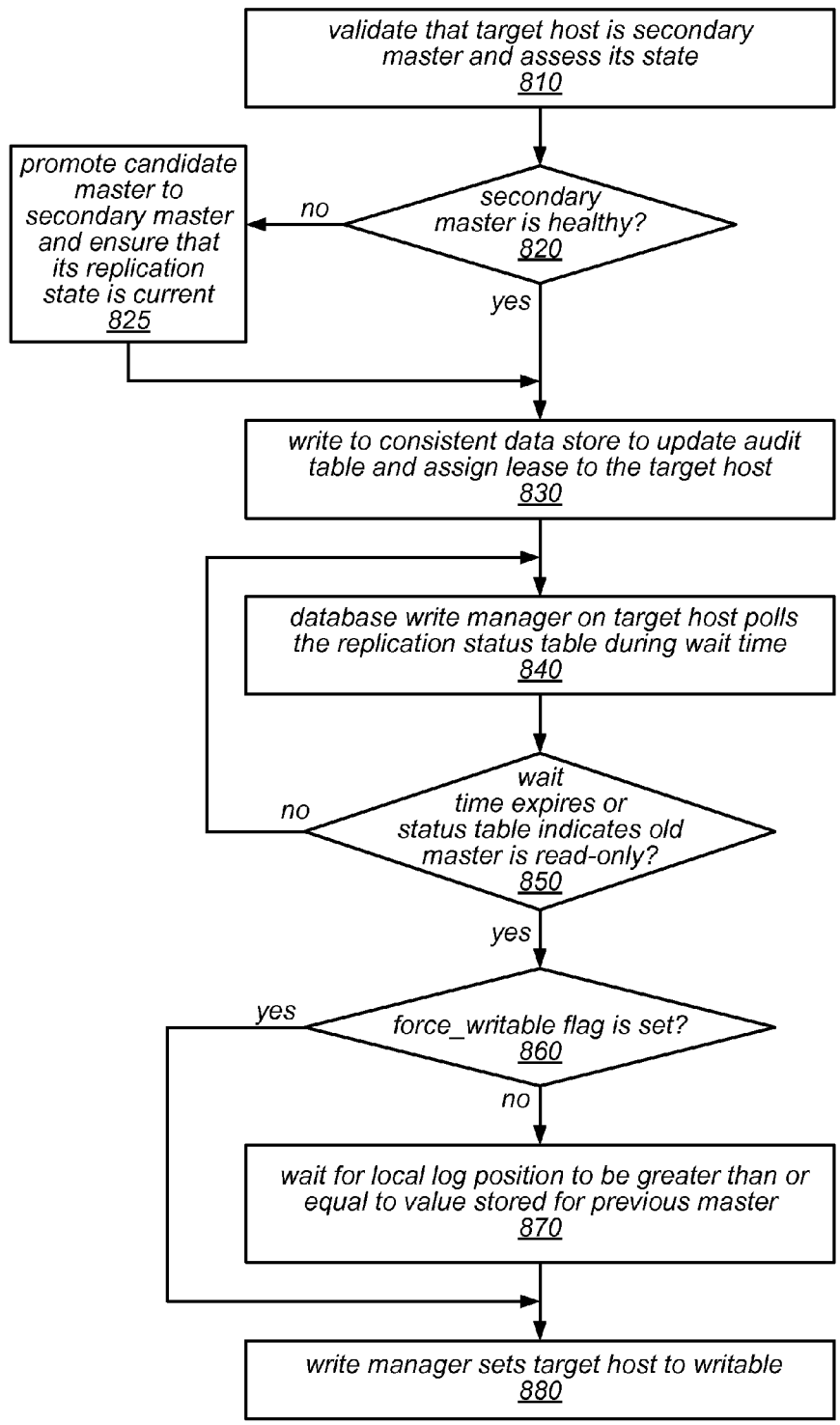
FIG. 8 is a flow diagram illustrating one embodiment of a method for performing a failover in a database system that employs lease based leader election.

One embodiment of a method for performing a failover in a database system that employs lease based leader election is illustrated by the flow diagram in FIG. 8. Note that in some embodiments, this process (some of which may be performed by a technician) may be triggered by the failure of a primary master, by a partitioning of the network making the primary master unable to renew its lease, or as a planned operation to assign a new primary master for a database. As illustrated at 810, in this example, the method may include validating that target host is the secondary master and assessing its state. If the secondary master is not healthy (shown as the positive exit from 820), the method may include promoting a candidate master (e.g., a candidate master in the same availability zone as the secondary master) to secondary master and ensuring that its replication state is current before continuing, as in 825.

Once a healthy secondary master has been identified (shown as the positive exit from 820 or the exit from 825), the method may include writing to a consistent data store to update an audit table for the corresponding database (e.g., to reflect this attempt to perform a failover from the primary master host to the secondary master) and assigning the lease to the target host (i.e., the secondary master), as in 830. The method may also include a database write manager executing on the target host beginning to poll the replication status table during a pre-determined wait time period, as in 840.

As illustrated in this example, once the wait time expires or the replication status table indicates that the previous primary master has switched to read-only mode (shown as the positive exit from 850), if the force_writable flag is set (shown as the positive exit from 860), the method may include waiting for the local log position to be greater than or equal to the log position value stored for the previous master before continuing, as in 870. However, if the force_writable flag is not set (shown as the negative exit from 860), or once the local log position is greater than or equal to the log position value stored for the previous master, the method may include the database write manager setting the target host to a writable state (e.g., to read-write mode), as in 880.

Figure 9:
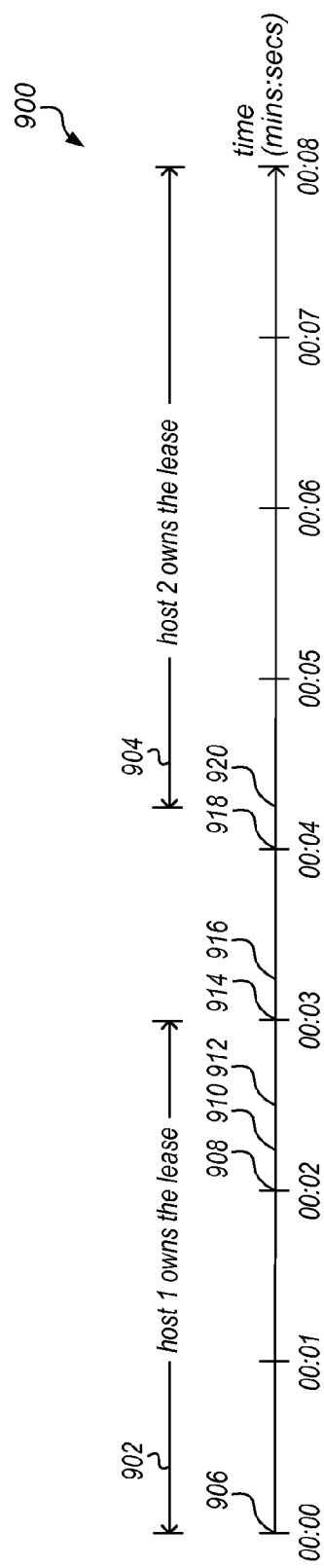
FIG. 9 is a timing diagram depicting various events (or triggers) and actions taken as part of a planned primary master failover from one host to another, according to at least some embodiments.

FIG. 9 is a timing diagram depicting various events (or triggers) and actions taken as part of a planned primary master failover from a host 1 to a host 2, according to at least some embodiments. Note that communication with the consistent data storage service that does not affect the failover process (e.g., periodic heartbeats) is not shown. In this example, at 906 of timeline 900 (which represents time 00:00), and during time interval 902 (from time 00:00-00:03), host 1 is the lease owner and is the writable master. Thus host 1 performs the role of primary master for the corresponding database. At 908 (time 00:02), host 1 renews the lease, and at 910 (time 00:02.250), host 2 sees that host 1 has the lease.

In this example, to trigger the planned failover at 912 (00:02.500), the lease is assigned to host 2 (e.g., by a technician or by other means). At 914 (time 00:03), host 1 detects that it is no longer the master and switches to read-only mode. At 916 (time 00:03.250), host 2 detects that it has the lease, and starts its wait time (e.g., a wait time that is based on the value of previous_master_wait_time, as described herein). In this example, at 918 (time 00:04), host 1 updates the lease information maintained in the consistent data storage service to indicate that it is in read-only mode and updates its final log position, and at 920 (time 00:04.250), host 2 checks the replication status table and sees that host 1 is in read-only mode. Therefore, host 2 no longer needs to wait for the wait time to elapse. Since this is the case, once host 2 has completely replicated all data from host 1, and its log position is greater than or equal to that of the final log position of host 1 that was stored to the consistent data storage service, host 2 switches to writable mode (e.g., read-write mode) and assumes the role of primary master (e.g., by updating the lease information maintained in the consistent data storage service). As illustrated in FIG. 9, during time interval 904 (from time 00:04.250-00:08), host 2 is the lease owner and is the primary (writable) master.

In embodiments that employ manual or semi-automatic implementations of the lease based leader election and failover protocols, such as those described above, human intervention may be required to select a new master and, if data loss occurs, to force the new master to become writable. In other embodiments, such as those described below, the database systems may be configured to handle both of these cases so that the failover process is fully automated.

As noted above, data loss may occur with asynchronous replication when a master fails before it is able to replicate all the data to its slaves. In some embodiments, an alternative method may be employed that uses synchronous replication between the master nodes, so that all data is replicated before committed locally. For example, the databases may be implemented as a multi-master cluster based on synchronous replication. In some such embodiments, the servers may be deployed with both asynchronous replication and synchronous replication at any time, which may allow nodes to be migrated to a cluster with minimal impact to the overall system.

In some embodiments when synchronous replication is enabled, each transaction on the primary master may be replicated to every other node in the cluster using an implementation of virtual synchrony. This protocol may guarantees that each transaction is assigned a unique sequence number and that all nodes see the same ordering for transactions. Once a sequence number is agreed upon for a transaction, each node in the cluster may perform a local certification test that determines whether any other transactions since the last committed transaction are conflicting. If there is a conflict, the latest transaction may be discarded. Since all nodes receive the transactions in the same order, this procedure is deterministic across all replicas. The unique primary key indexes of the modified rows may be used to detect collisions between transactions. The certification process may enable the use of multiple master nodes for mutating changes. However, in some embodiments, the database topology may not take advantage of this feature, since the existing API calls may generate a large number of collisions across multiple masters and decrease performance. In some cases, a single master model may be easier to debug when and if problems arise.

In some embodiments that employ synchronous replication, the system may use a different method to track replication position than in embodiments that employ a different synchronization approach. For example, in some such embodiments, each node in the cluster may keep track of its replication position using a global cluster identifier and sequence number. When a node wants to join a cluster, it may receive a copy of the data from the existing cluster nodes and may be marked as having joined the cluster once it is fully synchronized up to the latest replication position and can participate in the replication protocol. In some embodiments, if a node fails or becomes partitioned from the cluster, then after a specified inactive_timeout interval in which no messages have been received from the failed node, all the other nodes may be configured to remove the failed node from the cluster. Note that, during the timeout period, all transaction commits targeting the database may be blocked in the cluster until the failed node is removed. In one example, the inactive_timeout value for the cluster may be set to 15 seconds. In some embodiments, the clustering protocol may be enabled between the primary and secondary master and the candidate masters so that no data loss occurs when any of these hosts fail.

Figure 10:
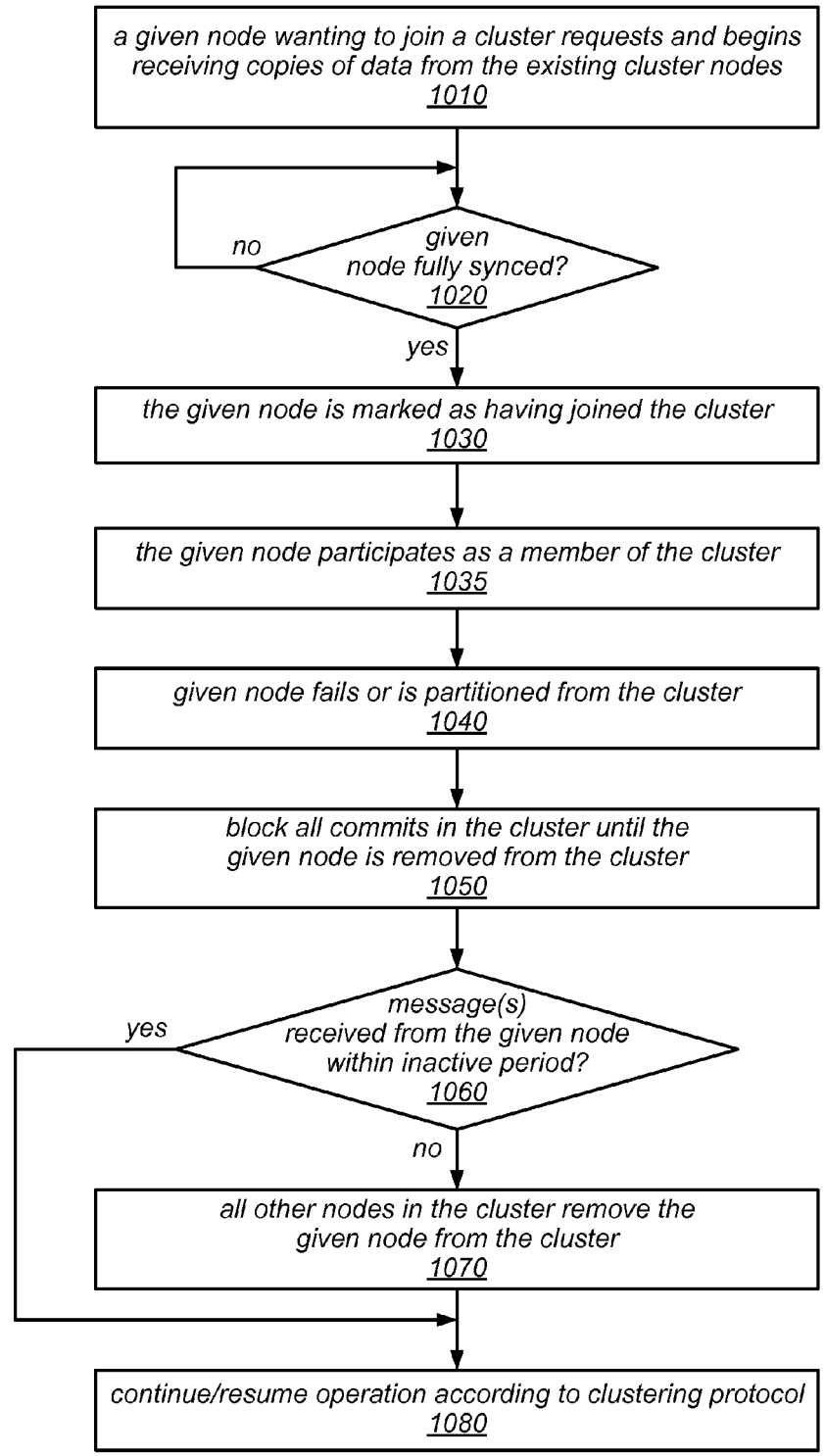
FIG. 10 is a flow diagram illustrating one embodiment of a method for avoiding data loss in a database system that employs synchronous replication and lease based leader election.

One embodiment of a method for avoiding data loss in a database system that employs synchronous replication and lease based leader election is illustrated by the flow diagram in FIG. 10. As illustrated at 1010, in this example, the method may include a given node that wishes to join a cluster requesting and beginning to receive copies of data from the existing cluster nodes. Once the given node is fully synchronized with the other nodes in the cluster (shown as the positive exit from 1020), the method may include marking the given node as having joined the cluster, as in 1030, after which the given node may participate as a member of the cluster (e.g., responding to various requests), as in 1035.

In this example, at some point after the given node joins the cluster, the given node fails or is partitioned away from the cluster (as shown in 1040). In this case, the method may include blocking all commits in the cluster until the given node is removed from the cluster, as in 1050. As illustrated in this example, if any messages are received from the given node within a predetermined inactive timeout period (shown as the positive exit from 1060), the method may include continuing (or resuming) operation according to the clustering protocol, as in 1080, without removing the given node. However, if no messages are received from the given node within the inactive timeout period (shown as the negative exit from 1060), the method may include all of the other nodes in the cluster removing the given node from the cluster, as in 1070, before continuing (or resuming) operation according to the clustering protocol, as in 1080.

Note that in some embodiments, with synchronous replication, there may be a small time window during which a data loss can go undetected in the case of a network partition. For example, during a network partition between the cluster nodes, the primary master must continue to take writes. Doing so may cause the primary master to diverge from the non-cluster nodes. In the best case, if the network partition gets resolved, then the non-cluster nodes will rejoin with the primary master and get the missing data. In the worst case, if the availability zone in which the primary master resides has a failure before the network partition gets resolved, then it may be possible for the data in the cluster to be lost. In some embodiments, this can be detected since the log position of the primary master in the consistent data store may be higher than that of the non-cluster nodes, so they will refuse to take ownership of the lease. The period during which this can go undetected is between the time a network partition occurs and the primary master posts its replication status to the consistent data store. Note that a failure of the primary master during this window will not be detected by the non-cluster nodes and they may take over the lease and become the master without that data. In one example, the heartbeat interval is one second, which is the time window for this failure to occur. In some embodiments, this data loss may be considered acceptable, since this problem may already exist with the asynchronous replication mechanisms in common use and the alternative is to synchronously update the log position in the consistent data store for every transaction, (which may add too much overhead for API calls).

In some embodiments that employ synchronous replication, the master election for automated failover may use the same lease protocol as that described above for the manual or semi-automatic implementations, with the exception that the secondary master may now acquire the lease if the primary does not renew it within the lease interval. Note that in some embodiments, a failover can still be triggered by a technician, e.g., using the same command line interface tool described above.

Figure 11:
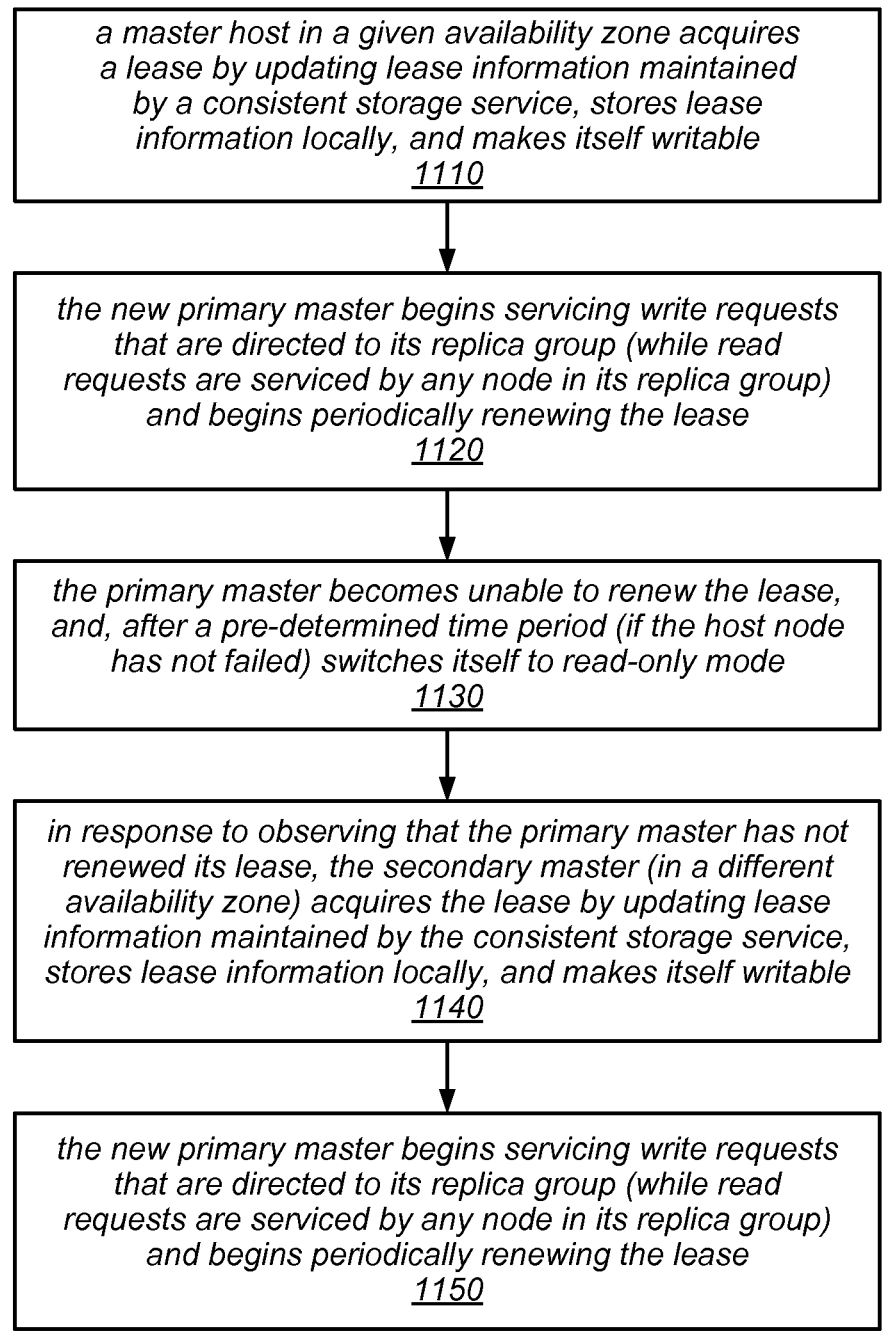
FIG. 11 is a flow diagram illustrating one embodiment of a method for performing an automatic failover in a database system that employs lease based leader election.

One embodiment of a method for performing an automatic failover in a database system that employs lease based leader election is illustrated by the flow diagram in FIG. 11. As illustrated at 1110, in this example, the method may include a master host in a given availability zone acquiring a lease by updating lease information maintained by a consistent storage service, storing the lease information locally, and making itself writable (thus assuming the role of primary master for the database). The method may also include this new primary master beginning to service write requests that are directed to its replica group (while read requests are serviced by any node in its replica group) and beginning to renew the lease periodically, as in 1120.

As illustrated in this example, if, at some point, the primary master becomes unable to renew the lease (e.g., due to a node failure or network partition), the method may include, after a pre-determined time period (assuming that the host node has not failed) the primary master switching itself to read-only mode, as in 1130. The method may also include, in response to observing that the primary master has not renewed its lease, the secondary master for the database (in a different availability zone) acquiring the lease by updating lease information maintained by the consistent storage service, storing the lease information locally, and making itself writable (as in 1140), thus assuming the role of primary master in place of the previous primary master. Note that, in various embodiments, the secondary master may wait for some pre-determined period of time after observing that the primary master has not renewed its lease before acquiring the lease and/or may follow a replication synchronization protocol before making itself writable, as described herein.

Once the secondary master has assumed the role of primary master (e.g., by acquiring the lease and making itself writable), the method may include this new primary master beginning to service write requests that are directed to its replica group (while read requests are serviced by any node in its replica group) and beginning to renewing the lease periodically, as in 1150. Note that the operations illustrated in 1130-1150 may be repeated any number of times during the operation of the database to perform a failover operation, when needed.

Figure 12:
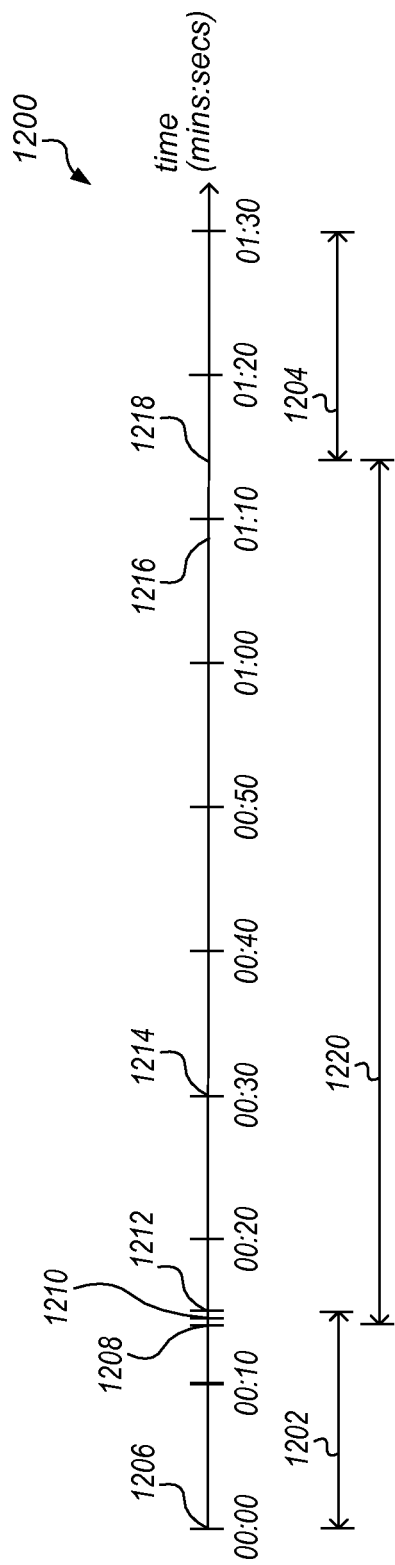
FIG. 12 is a timing diagram depicting various events (or triggers) and actions taken as part of an automated failover from a host 1 to a host 2, according to at least some embodiments.

FIG. 12 is a timing diagram depicting various events (or triggers) and actions taken as part of an automated failover from a host 1 to a host 2, according to at least some embodiments. Again note that communication with the consistent data storage service that does not affect the failover process (e.g., periodic heartbeats) is not shown. In this example, at 1206 of timeline 1200 (which represents time 00:00), and during time interval 1202 (from time 00:00-00:15), host 1 is the lease owner and is the writable master. Thus host 1 performs the role of primary master for the corresponding database. At 1208 (time 00:14), host 1 renews the lease, and at 1210 (time 00:14.250), host 2 sees that host 1 has the lease. In this example, at 1212 (time 00:15), host 1 fails (or is otherwise made unable to renew the lease). Therefore, at 1214 (time 00:30), host 1 is marked as inactive (because it did not renew the lease) and is removed from the cluster.

In this example, time internal 1220 (from time 00:14.250-1:14.250) is the host 2 wait time (i.e., the time that host 2 waits for host 1 to renew its lease). At 1216 (time 01:09), if host 1 was partitioned, it puts itself into read-only mode at this time (i.e., at the beginning of the safe time interval). At 1218 (time 01:14.250), because the wait time has elapsed, host 2 checks its replication status against the last log position of host 1 that was stored to the consistent data storage service. If the log position of host 2 is greater than or equal to that of the last stored value for host 1, host 2 acquires the lease and switches to writable mode (e.g., read-write mode). Note that if host 2 has not completely replicated all data from host 1 at this point (e.g., at the point at which the wait time elapses), it may have to wait until its log position is greater than or equal to that of the final log position of host 1 before switching to writable mode (assuming writable mode is not forced earlier due to data loss) and assuming the role of primary master. As illustrated in FIG. 12, during time interval 1204 (from time 01:14.250 until at least 01:30), host 2 is the lease owner and is the primary (writable) master.

In some embodiments, when and if the consistent data store experiences an outage, all of the databases that rely on the consistent data store to implement the lease base protocols described herein may go into read-only mode once the lease period has expired. In doing so, the ability to make mutating calls for the system may be tied to the availability of the consistent data store. In some embodiments, the system may include an override mechanism to set a database to be writable due to increased complexity and additional states to the failover protocol that may not be continuously tested. In some embodiments, it may be possible to disable the client from all of the databases and revert to manually setting a database to be writable until any bug is fixed.

In some embodiments, during an availability zone network partition, the failover system should continue to operate as long as the consistent data store is available and one of the master hosts can reach the consistent data store. For example, if the current primary master can still reach the consistent data store, there may be no impact on the primary master and it may remain in the writable state. In this example, when the networking partition is resolved, all stale database hosts may synchronize to obtain missing information from the primary master or the cluster. If the primary master is partitioned, it may switch to a read-only state after the wait time expires, at which point the secondary master should be set to writable. If both masters are partitioned from the consistent data store, then it has the same effect as an outage of the consistent data store.

Note that, when a master host holds the lease, it may need to be able to retry the PutItem and GetItem requests to the consistent data store if an API call fails so that it does not switch to read-only mode unnecessarily. In some embodiments, by setting the requests from the clients to timeout at 1000 ms, they should be able to retry requests multiple times and allows for large spikes in the latencies of the APIs for the consistent data storage service.

In some embodiments that employ the automated failover system, high load from database clients, or network jitter from the consistent data store, may cause the lease to expire and the master hosts to continuously failover. In order to avoid this, each master may be configured to acquire a lease only if it did not have the lease within a pre-determined time period (e.g., within the past five minutes).

In some embodiments, database write manager threads may run in a simple loop and may only read information from shared memory so that they blocks primarily on the CPU. If the primary master is under high CPU load, the threads could be blocked from switching a host to read-only. In one embodiment, all of the master hosts may have either 12 or 16 cores. Theses master hosts may generally have the database process as the only process that consumes any detectable CPU usage, which makes it a low risk for all the cores on the host to be completely in use at one time. In order to limit the chance of the database write manager threads from being blocked, the threads may be set to the highest available thread priority (as defined by the operating system or runtime environment).

In some embodiments, all operations may be dependent on the relative time intervals on individual hosts, such that the hosts are not required to be kept in sync. For example, in some embodiments, a local timestamp that was stored (by a database state manager on a given master host) along with lease record information and that corresponds to the time at which the particular lease record was accessed by the database state manager on the given master host may be compared with another local timestamp that was stored along with lease record information when the lease record was previously accessed by the given master host to determine whether the pre-determined lease period or a safe portion of the pre-determined lease period has expired. In addition, all timing calculations may be done based on clock monitoring utilities that are provided with the operating system or runtime embodiment, such that any modifications to the time from network time protocol or leap second adjustments will not affect the lease timings. Note that the lease protocol may not use any absolute timestamps. Therefore, clock skew may not be a factor in applying the lease protocol, and the worst case clock skew on a CPU (around 0.001%) may be considered negligible in the context of the timing values used by the application.

Note that in some embodiments, rather than implementing the lease protocol described herein as a process, the lease protocol may be executed as a plugin that gets loaded into the database server process. When running as a process, the lease protocol client running on the primary master can crash, leaving the database in a writable state and causing the lease to expire. Implementing the lease protocol as a plugin may make the database process dependent on the availability of the lease based leader election and master failover system and may avoid this failure scenario. However the plugin model may have many downsides due to the overhead of the plugin architecture, whereas a separate process may be easier to implement, test, and deploy. In addition, a bug in the plugin can potentially cause both masters to crash at the same time, causing a region wide outage. Implementing the lease protocol described herein as a separate process may make it easier to prove that the code is correct. Note also that in some embodiments, the systems described herein may employ some existing methods to ensure that the process is running.

Other implementations for synchronous replication that may be employed, in some embodiments, include block level replication, and the simulation of logical synchronous replication through the database process' semi-synchronous replication feature. However, both of these approaches may require a large amount of configuration as the cluster membership is modified.

In some embodiments, the system may provide a quorum management feature for a synchronous cluster that blocks nodes from making mutating changes if they are not in the majority partition of the cluster. This feature may be used to avoid the data loss scenarios described above, as long as the read-write master is always elected from the majority partition. There may be additional complexity in managing cluster timing variables and implementation, since using the quorum calculations from the cluster may require coordination between state changes in the consistent data store and the cluster. Note that this approach may not be viable in a system that includes two availability zone regions, since an availability zone failure can cause all mutating calls to fail until it is restored. Because of these limitations, the quorum calculations may not be used in the synchronous replication architecture described herein.

Another method that may be employed to avoid undetected data loss with synchronous replication, in some embodiments, may be to include cluster membership information in the replication status table in the consistent data store. In such embodiments, if the primary master synchronously posts the members of its cluster when a membership change occurs, the secondary master may be able to determine whether it was part of the primary's cluster when the primary fails. If the secondary master sees that it was not part of the primary cluster, it may refrain from acquiring the lease in order to prevent potential data loss from occurring. In this case, a technician may need to evaluate whether any data can be recovered or to manually assign the lease to the secondary master and force it to become writable. This method may require the posting of updates to the consistent data store to reflect membership changes and the blocking of writes on the database until the update is successful.

In some embodiments, as hosts fail and new ones are added as primary and secondary masters, stale entries may remain in the replication status table maintained in the consistent data store. This may not impact the performance of the system, but may cause confusion for operators that use the table information to debug the system state. In some embodiments, it may be possible to add a timestamp column to the replication status table and to prune any entries that have not been updated within a selected time interval.

In some embodiments, the systems described herein may contain backend processes that continuously scan the databases for new updates and may propagate this information to individual VPC droplets. In some embodiments, as the backend processes are reading updates from the database, they maintain an overall fingerprint of all the updates collected which serves as a checksum for each set of updates. Data loss at the database level can result in fingerprint mismatches due to inconsistent updates stored across the backend fleet. When this occurs, the immediate step usually taken by technicians to fix the inconsistencies may be to have the backend hosts complete a full reload of the database, such that they have a consistent view. Afterward, the cause of the fingerprint mismatch may be identified and corrected in the database, as needed.

Note that while lease based leader election and master failover protocols have been described in detail herein in terms of their application to database systems, in other embodiments, these techniques may be more generally applicable in any system in which a particular (or exclusively held) role is assigned to one computing node at a time in a group of computing nodes that operate collectively, including those that operate over multiple availability zones. For example, in some embodiments, only one computing node within a group of computing nodes can be authorized to execute a particular process at a time or to access a particular resource at a time. In such embodiments, the lease based leader election techniques described herein may be used to assign the particular role to one node in a group of nodes at a time. For example, in one such embodiment, when ownership of a lease changes from one computing node to another, a particular process that can only be executed by the lease holder may be killed on the node that currently owns the lease prior to (or as part of) the acquisition of the lease by another computing node, after which the process may be executed exclusively by the new lease holder. In another example, when ownership of a lease changes from one computing node to another, access to a particular resource that can only be accessed by the lease holder may be disabled or revoked for the node that currently owns the lease prior to (or as part of) the acquisition of the lease by another computing node, after which access to the particular resource may be enabled exclusively for the new lease holder.

In some such systems, the group of nodes may employ a consistent data store (or consistent data storage system) that is accessible by multiple ones of the nodes (e.g., nodes that are configured to assume the particular role, if authorized to do so) to maintain state information for a lease that represents an authorization to assume a particular role within the group of nodes for a pre-determined lease period. In these systems, the computing nodes may acquire the lease by updating the lease information (e.g., a lease record) in the consistent data store, may assume the particular role following acquisition of the lease, and may continue to hold the lease and perform in that role by periodically renewing the lease (e.g., by updating the lease information in the consistent data store, as described herein). In some embodiments, a computing node that acquires the lease may hold the lease indefinitely, e.g., until and unless it fails, loses communication with the consistent data store in which the lease information is maintained, or is otherwise unable to renew the lease. In other embodiments, a computing node that acquires the lease may only hold the lease for one or a few lease periods (e.g., long enough to perform one or more tasks while assuming the particular role) and then refraining from renewing it, allowing another node to assume that role.

Figure 13:
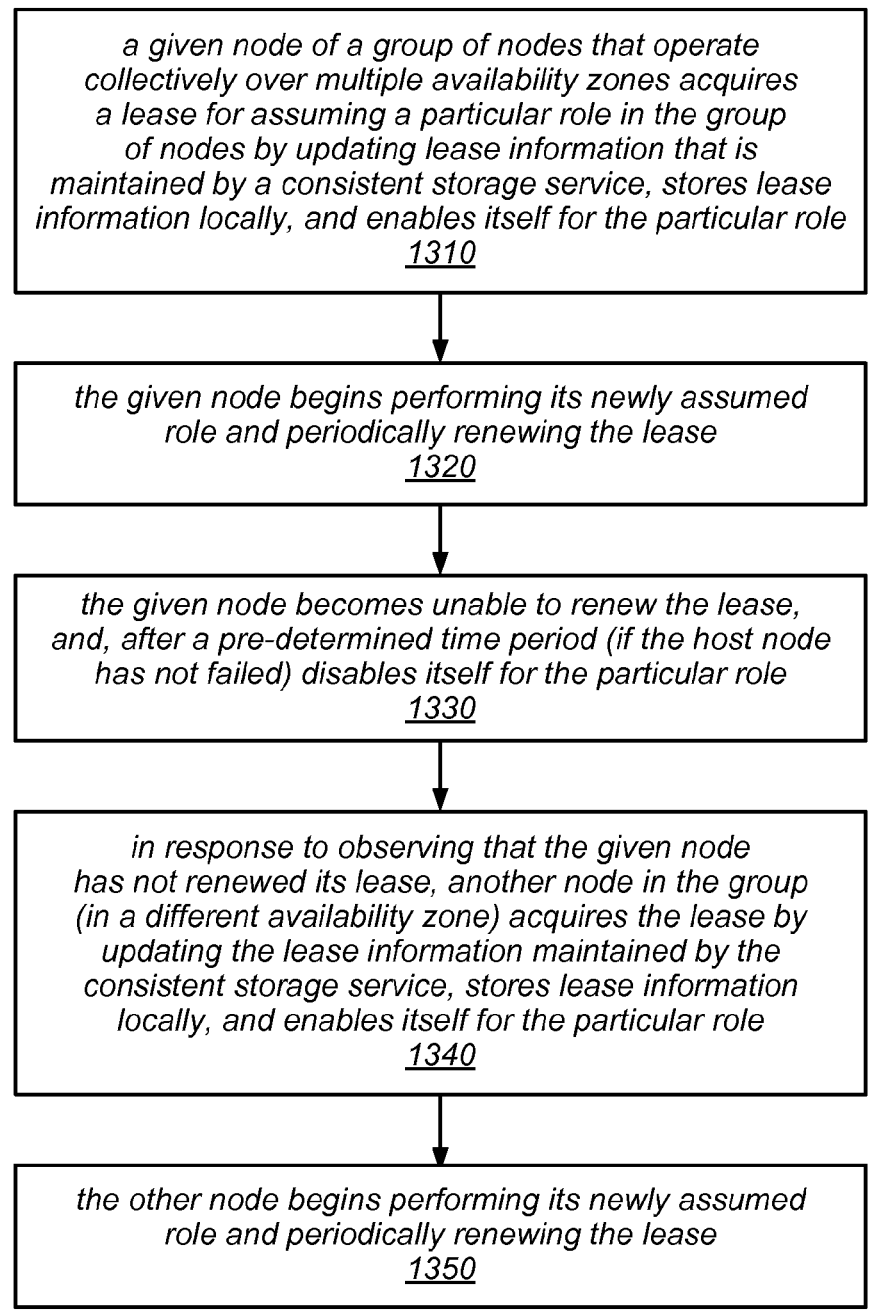
FIG. 13 is a flow diagram illustrating one embodiment of a method for using a lease based leader election technique to assign a particular role to one node in a group of nodes.

One embodiment of a method for using a lease based leader election technique to assign a particular role to one node in a group of nodes is illustrated by the flow diagram in FIG. 13. As illustrated at 1310, in this example, the method may include a given node of a group of nodes that operate collectively over multiple availability groups acquiring a lease for assuming a particular role in the collection of nodes by updating lease information that is maintained by a consistent storage service that is accessible to nodes in the multiple availability zones over which the group of nodes operates, storing the lease information locally, and enabling itself for the particular role. For example, the given node may enable itself to assume a role in which it is the only node authorized to perform a given task on behalf of the group of nodes (e.g., to execute a particular process that can only be executed by the lease holder). In various embodiments, the given node may enable itself for the particular role by marking itself as holding the role, setting a parameter to grant itself authorization to perform the given task or otherwise enabling it to assume the duties and/or responsibilities of the role.

After assuming the particular role, the method may include the given node beginning to perform its newly assumed role and renewing the lease periodically (e.g., by updating the lease information stored by the consistent storage service), as in 1320. If, at some point, the given node becomes unable to renew the lease, and (in some embodiments) after a pre-determined time period (assuming the host node has not failed), the method may include the given node disabling itself for the particular role, as in 1330. For example, the given node may disable itself for the particular role by marking itself as no longer holding the role, setting a parameter to revoke its authorization to perform the given task or otherwise disabling its ability to perform the duties and/or responsibilities of the role, in different embodiments.

As illustrated in this example, in response to observing that the given node has not renewed its lease, the method may include another node in the group (e.g., a node in a different availability zone) acquiring the lease by updating the lease information maintained by the consistent storage service, storing lease information locally, and enabling itself for the particular role, as in 1340. As noted above, the other node may enable itself for the particular role by marking itself as holding the role, setting a parameter to grant itself authorization to perform the given task or otherwise enabling it to assume the duties and/or responsibilities of the role. In some embodiments, acquiring the lease may include killing a particular process that is executing on the node that previously held the lease (e.g., a process that can only be executed by the node that holds the lease and that has assumed the particular role within the group of nodes). The method may also include the other node beginning to performing its newly assumed role and renewing the lease periodically, as in 1350. As with previous examples of the use of lease based leader election, the operations illustrated in 1330-1350 for performing a failover type operation may be repeated any number of times in order to manage the assignment of the particular role to different nodes in the group of nodes in response to a failure or network partition that makes a node having the role unable to renew its lease and/or perform the duties and/or responsibilities of the role.

Figure 14:
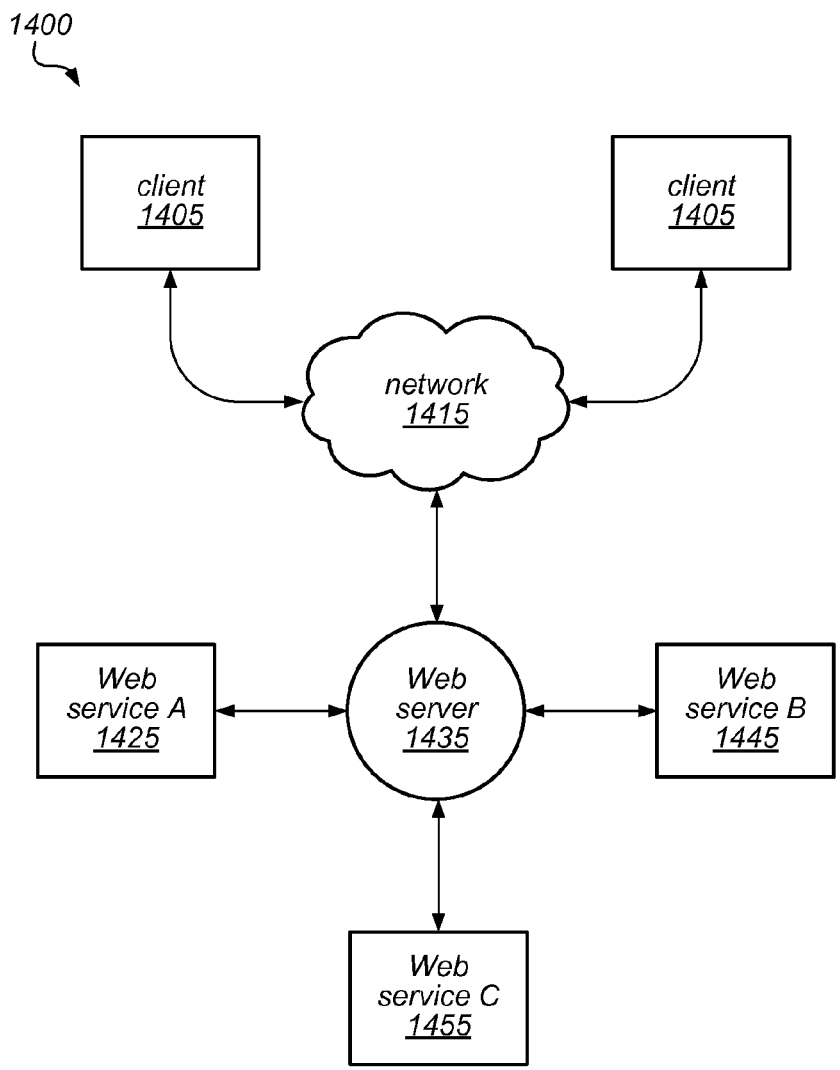
FIG. 14 is a block diagram illustrating one embodiment of a system that provides various Web-based services to clients.

Various techniques described herein may be employed in local or remote computing systems, including systems that provide services (such as database services, storage services and/or other services) to clients (e.g., client applications, users, or subscribers) over the Internet or over other public or private networks, such as virtual private networks and connections to services in a virtual private cloud (VPC) environment. FIG. 14 illustrates a block diagram of a system that provides various Web-based services to clients, according to one embodiment. In this example, system 1400 includes one or more clients 1405. In this example, the clients 1405 may be configured to interact with a Web server 1435 via a communication network 1415.

As illustrated in this example, the Web server 1435 may be configured to process requests from clients 1405 for various services, such as Web service A (1425), Web service B (1445), and Web service C (1455), and to return results to the clients 1405. Each of the web services may provide clients with one or more of: computational resources, database services, data storage services (e.g., maintaining data in one or more tables on behalf of a client), or any other types of services or shared resources.

Figure 15:
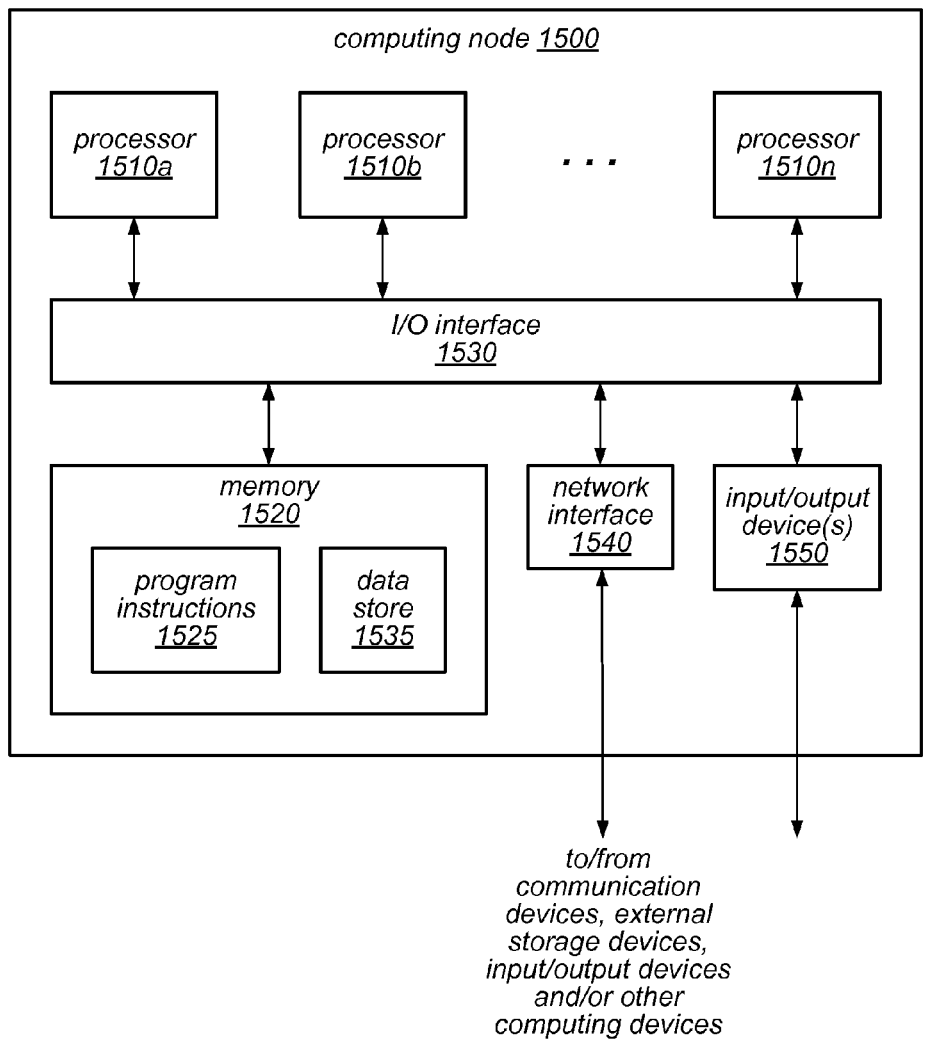
FIG. 15 is a block diagram illustrating an example computing node that implements some or all of the techniques described herein, according to different embodiments.

One computing node that implements some or all of the techniques described herein is illustrated by the block diagram in FIG. 15, according to at least some embodiments. Computing node 1500 may include functionality to provide any or all of the components of a system that implements a data storage service or another type of service that employs lease based leader election and/or master failover protocols, or multiple computing nodes similar to or different from computing node 1500 may collectively provide this functionality, in different embodiments. For example, in various embodiments, one or more computing nodes 1500 may implement any number of storage service clients 110 (as illustrated in FIG. 1), any number of computing nodes of a database service 150, any number of storage devices, database instances, or storage node instances of a consistent data store or consistent data storage service 160, and/or any other components of other services 140, Web services platform 130, or external resources that interact with Web services platform 130. Any number of these database instance or storage node instances of a consistent data store or consistent data storage service 160 may each host one or more replicas of various data partitions and/or metadata associated therewith. For example, any given storage node instance 160 may host a replica acting as master host for its replica group and/or a replica acting as a slave replica in its replica group. In some embodiments that include multiple computing nodes 1500, all of the computing nodes 1500 may include the same or similar hardware components, software components, and functionality, while in other embodiments, the computing nodes 1500 comprising a computing system configured to implement the functionality described herein may include a wide variety of hardware components, software components, and functionality. In some embodiments, multiple computing nodes 1500 that collectively implement a database service 150, a consistent data store or storage service 160 and/or other services 140 may be components of a larger shared resource system or grid computing system.

In the illustrated embodiment, computing node 1500 includes one or more processors 1510 coupled to a system memory 1520 via an input/output (I/O) interface 1530. Computing node 1500 further includes a network interface 1540 coupled to I/O interface 1530, and one or more input/output devices 1550. As noted above, in some embodiments, a given node may implement the functionality of more than one component of a system that manages and maintains data in tables (e.g., in a non-relational database) on behalf of data storage service clients, such as that described herein. In various embodiments, a computing node 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA. Similarly, in a distributed computing system such as one that collectively implements a database service or consistent data storage service over multiple availability zones, each of the computing nodes may implement the same ISA, or individual computing nodes and/or replica groups of nodes may implement different ISAs.

In some embodiments, system memory 1520 may include a non-transitory, computer-readable storage medium that stores program instructions and/or data accessible by processor(s) 1510. In various embodiments, system memory 1520 may be implemented using any suitable memory technology, such as static random access memory (SRAM), synchronous dynamic RAM (SDRAM), nonvolatile/Flashtype memory, or any other type of memory. In the illustrated embodiment, program instructions and data implementing desired functions, such as those described above, are shown stored within system memory 1520 as program instructions 1525 and data storage 1535, respectively. For example, program instruction 1525 may include program instructions that when executed on processor(s) 1510 implement any or all of a database service 150, a consistent data storage service 160, a client process of a lease based leader election and master failover mechanism, a database state manager, a database write manager, other services 140, and/or any other components, modules, or sub-modules of a system that provides the functionality described herein. Program instructions 1525 may also include program instructions configured to implement additional functionality of a system that implements lease based leader election and master failover techniques that are not described herein.

Data storage 1535 may in various embodiments include collections of data maintained by a database service or consistent data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data and/or resource usage data, and/or timing parameter values for a master failover protocol). In other embodiments, program instructions and/or data as described herein for implementing a database service and/or a consistent storage service that employ the techniques described above may be received, sent or stored upon different types of computer-readable media or on similar media separate from system memory 1520 or computing node 1500. Generally speaking, a computer-readable medium may include storage media or memory media such as magnetic or optical media, e.g., disk or CD/DVD-ROM coupled to computing node 1500 via I/O interface 1530. Program instructions and data stored on a computer-readable storage medium may be transmitted to a computing node 1500 for execution by a processor 1510a by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor(s) 1510, system memory 1520, and any peripheral devices in the computing node, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computing node 1500 and other devices attached to a network (such as other computer systems, communication devices, input/output devices, or external storage devices), or between other nodes in a system providing shared computing services. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or retrieving data by one or more computing nodes 1500. Multiple input/output devices 1550 may be present in computing node 1500 or may be distributed on various computing nodes of a system that is configured to implement the techniques described herein. In some embodiments, similar input/output devices may be separate from computing node 1500 and may interact with one or more computing nodes of a system through a wired or wireless connection, such as over network interface 1540.

Database service clients and/or consistent data storage service clients (e.g., users, subscribers and/or client applications) may interact with these services such as that described herein in various ways in different embodiments, such as to submit requests for service (including, but not limited to, requests to store, retrieve and/or update items in tables, or requests to repartition a table), and to receive results. For example, some subscribers to the service may have physical access to computing node 1500, and if so, may interact with various input/output devices 1550 to provide and/or receive information. Alternatively, other clients/users may use client computing systems to access the system, such as remotely via network interface 1540 (e.g., via the Internet and/or the World Wide Web). In addition, some or all of the computing nodes of a system providing the service may provide various feedback or other general types of information to clients/users (e.g., in response to user requests) via one or more input/output devices 1550.

Those skilled in the art will appreciate that computing node 1500 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1500 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1500 may be transmitted to computing node 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that, in different embodiments, the lease based leader election and master failover techniques described herein may be applicable in systems that include a non-relational database or in which a non-relational data store is implemented using a different storage paradigm.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a database service, implemented by one or more computing devices and configured to store a replica of a database table on respective master hosts on computing devices in the system, each master host residing in a different availability zone, wherein a master host configured to act as a primary master host can service write requests that are directed to the database table;
    a data storage service, implemented by one or more computing devices;
    wherein one of the master hosts is configured to assume the role of primary master host for the database table, wherein to assume the role of primary master host, the one of the master hosts is configured to:
        update a lease record maintained by the data storage service to reflect that the one of the master hosts holds a lease for the database table, wherein the lease represents an authorization to act as the primary master host for the database table for a pre-determined lease period; and
        enter a writable mode that enables writing to the replica of the database table stored on the one of the master hosts;
    wherein the other one of the master hosts is configured to:
        access the lease record to determine whether the lease is held; and
        in response to determining that the lease is held by the one of the master hosts, maintain the replica of the database table stored on the other one of the master hosts in a read-only mode;
    wherein the one of the master hosts is further configured to:
        access, subsequent to assuming the role of primary master host and prior to expiration of the pre-determined lease period, the lease record to determine whether the lease is still held by the one of the master hosts;
        maintain the replica of the database table stored on the one of the master hosts in the writable mode and renew the lease, in response to determining that the lease is still held by the one of the master hosts, wherein to renew the lease, the one of the master hosts updates the lease record to reflect that the one of the master hosts still holds the lease and that it has been renewed; and
        enter a read-only mode and refrain from renewing the lease, in response to determining that the lease is held by the other one of the master hosts.

2. The system of claim 1, wherein, while the one of the master hosts holds the lease, the one of the master hosts is further configured to:
    receive and service write requests that are directed to the database table; and
    replicate the write requests to the other one of the master hosts.

3. The system of claim 1, wherein the other one of the master hosts is configured to assume the role of primary master host for the database table and enter a writable mode, in response to the one of the master hosts entering a read-only mode.

4. The system of claim 3,
wherein each of the respective master hosts is further configured to store information reflecting its replication status to the data storage service;
wherein, prior to entering the writable mode, the other one of the master hosts is configured to determine, based at least in part on the information reflecting its replication status and the replication status of the one of the master hosts, whether the data in the replica of the database table on the other one of the master hosts is caught up with the data in the replica of the database table on the one of the master hosts; and
wherein the other one of the master hosts is configured to enter the writable mode in response to determining that the data in the replica of the database table on the other one of the master hosts is caught up with the data in the replica of the database table on the one of the master hosts.

5. The system of claim 1, further comprising, in each of the availability zones, one or more read-only replicas of the database table, wherein each of the read-only replicas is hosted on a computing device in the system that serves as a slave with respect to the master host residing in the same availability zone.

6. A method, comprising:
performing by one or more computers:
acquiring, by a given one of a group of two or more computing nodes that operate collectively over multiple availability zones, a lease that represents an authorization to assume a particular role within the group of computing nodes for a pre-determined lease period, wherein at most one of the computing nodes in the group can be authorized to perform the particular role at a time, and wherein acquiring the lease comprises updating a lease record maintained in a consistent data store to reflect the acquisition of the lease;
renewing, one or more times by the given computing node subsequent to said assuming the particular role, the lease, wherein renewing the lease comprises updating the lease record to reflect the continued ownership of the lease by the given computing node;
accessing, by another one of the group of computing nodes, the lease record maintained in the consistent data store;
determining, by the other computing node, dependent at least in part on the lease record, whether the given computing node has renewed the lease during a most recent lease period;
acquiring, by the other computing node, in response to determining that the given computing node has not renewed the lease during the most recent lease period, the lease, wherein acquiring the lease comprises updating the lease record to reflect the acquisition of the lease by the other computing node; and
assuming, by the other computing node, the particular role within the group of computing nodes for the next lease period.

7. The method of claim 6, further comprising:
performing, by the given computing node, the particular role within the group of computing nodes while it holds the lease.

8. The method of claim 7,
wherein performing, by the given computing node, the particular role within the group of computing nodes while it holds the lease comprises executing a particular process that can only be executed by the one of the computing nodes that holds the lease; and
wherein acquiring, by the other computing node, the lease further comprises killing the particular process on the given computing node.

9. The method of claim 6, further comprising:
storing locally, by the other computing node, the lease record and a local timestamp indicating when the lease record was accessed; and
comparing, by the other computing node, the local timestamp with another local timestamp that was stored along with the lease record when the lease record was previously accessed to determine if the pre-determined lease period or a safe portion of the pre-determined lease period has expired.

10. The method of claim 6, wherein the given computing node did not renew the lease during the most recent lease period due to a failure of the given computing node during the most recent lease period or because the given computing node was unable to access the consistent data store during the most recent lease period.

11. The method of claim 6,
wherein the group of computing nodes implements a database service;
wherein the particular role assumed by the given computing node is that of a primary master host for replicas of a database table that is stored by the database service on respective ones of the computing nodes in the group of computing nodes; and
wherein the replica stored on the primary master host is the only replica stored on the computing nodes in the group of computing nodes that is writable.

12. The method of claim 11, further comprising:
servicing, by the given computing node while acting as the primary master host for replicas of the database table, write requests that are directed to the database table;
replicating, by the given computing node while acting as the primary master host for replicas of the database table, the write requests to one or more computing nodes serving as slaves to the primary master host and to a computing node in an availability zone other than an availability zone in which the given computing node resides that serves as a secondary master host for replicas of the database table, wherein replicas stored on the one or more computing nodes serving as slaves to the primary master host and the replica stored on the secondary master host are read-only replicas; and
replicating, by the computing node that serves as the secondary master host, the write requests to one or more computing nodes in the other availability zone serving as slaves to secondary master host, wherein replicas stored on the one or more computing nodes serving as slaves to the secondary master host are read-only replicas.

13. The method of claim 11, further comprising, subsequent to determining that the given computing node has not renewed the lease during the most recent lease period and prior to acquiring the lease:
waiting, by the other computing node, for a pre-determined wait period to expire or for replication status information maintained by the consistent data store to indicate that the given computing node has switched from a writable mode to a read-only mode.

14. The method of claim 11, wherein assuming, by the other computing node, the particular role within the group of computing nodes for the next lease period comprises:

determining, by the other computing node, whether the database table has been completely replicated on the other computing node; and switching, by the other computing node, from a read-only mode to a writable mode, in response to determining that the database table has been completely replicated on the other computing node or in response to determining that a flag indicating that the other computing node should be forced into a writable mode is set.

15. The method of claim 11,
wherein the other computing node is a computing node in an availability zone other than an availability zone in which the given computing node resides that serves as a secondary master host for replicas of the database table; and
wherein acquiring, by the other computing node, the lease, and said assuming, by the other computing node, the particular role within the group of computing nodes for the next lease period are performed automatically by the other computing node in response to in response to determining that the given computing node has not renewed the lease during the most recent lease period.

16. The method of claim 11, further comprising:
storing, by each of the given computing node and the other computing node to the consistent data store, one or more of: replication status information indicating the latest transaction that was applied to the replica of the database table stored on the corresponding computing node or audit data describing one or more attempts made by the corresponding computing node to acquire the lease.

17. A non-transitory, computer-readable storage medium storing program instructions that when executed on one or more computers cause the one or more computers to implement a database service,
wherein the database service comprises two master hosts, each residing in a different availability zone;
wherein each of the master hosts executes a respective instance of a client process for performing lease based leader election, and wherein the respective instances of the client process collectively control assumption, by no more than one of the master hosts at a time, of the role of primary master host for a given database table, replicas of which are stored on each of the master hosts;
wherein to control assumption of the role of primary master host, the respective instance of the client process executing on each of the master hosts is configured to perform one or more of:
  accessing lease information for the given database table that is maintained by a consistent data storage service;
  determining, dependent on the lease information, whether a lease that represents an authorization to assume the role of primary master host for the given database table for a pre-determined lease period is held by one of the master hosts;
  determining, dependent on the lease information or on replication status information for one or more of the master hosts that is maintained by the consistent data storage service, whether a master host that holds the lease has renewed the lease within a most recent lease period;
  acquiring the lease in response to determining that no other master host holds the lease or that a master host that holds the lease has not renewed the lease within a most recent lease period, wherein acquiring the lease comprises updating the lease information for the given database table that is maintained by the consistent data storage service to reflect the acquisition of the lease by the master host; or
  renewing the lease prior to the expiration of the lease period in response to determining that the master host holds the lease, wherein renewing the lease comprises updating the lease information for the given database table that is maintained by the consistent data storage service to reflect the continued ownership of the lease by the master host.

18. The storage medium of claim 17, wherein the client process instance executing on each of the master hosts comprises a database state manager process,
wherein the database state manager process performs:
  said accessing the lease information for the given database table that is maintained by a consistent data storage service;
  said determining whether the lease is held by one of the master hosts; and
  said renewing the lease; and
wherein the database state manager process further performs:
  storing the lease information for the given database table locally on the master host; and
  updating the replication status information for the master host that is maintained by the consistent data storage service.

19. The storage medium of claim 18, wherein the client process instance executing on each of the master hosts comprises a database write manager process,
wherein the database state manager process performs:
  determining, dependent at least in part on the lease information for the given database table that is stored locally on the master host by the database state manager process, whether the master host owns the lease and whether the lease has been renewed during a most recent lease period; and
  maintaining the replica of the given database table that is stored on the master host in a writable state in response to determining that the master host owns the lease and that the lease has been renewed during a most recent lease period or placing the replica of the given database table that is stored on the master host in a read-only state in response to determining that the master host does not own the lease or that the master host owns the lease but did not renew the lease during a most recent lease period.

20. The storage medium of claim 19,
wherein placing the replica of the given database table that is stored on the master host in a read-only state in response to determining that the master host does not own the lease or that the master host owns the lease but did not renew the lease during a most recent lease period comprises issuing a command to place the replica in a read-only state that blocks until all active transactions directed to the replica of the given database table that is stored on the master host have released their locks; and
wherein the database state manager process further performs killing all active transactions that have not released their locks within a pre-determined blocking period.

21. The storage medium of claim 18,
wherein storing the lease information for the given database table locally on the master host comprises storing the lease information along with a timestamp indicating the time at which the lease information was retrieved from the consistent data store or the time at which the lease information was stored locally; and wherein the database state manager process further performs determining, dependent at least in part on the timestamp, whether a lease period or a safe portion of the a lease period has expired.

\* \* \* \* \*